(12) United States Patent
Hancock et al.

(10) Patent No.: US 10,491,711 B2
(45) Date of Patent: Nov. 26, 2019

(54) ADAPTIVE STREAMING OF VIRTUAL REALITY DATA

(71) Applicant: EEVO, Inc., Brooklyn, NY (US)

(72) Inventors: Casey Robert Hancock, Brooklyn, NY (US); Michael Phan, Toronto (CA); Jacob Russel Adelgren, Brooklyn, NY (US); Nicholas Paul Sahler, Cranbury, NJ (US)

(73) Assignee: EEVO, Inc., Brooklyn, NY (US)

( * ) Notice: Subject to any disclaimer, the term of this patent is extended or adjusted under 35 U.S.C. 154(b) by 173 days.

(21) Appl. No.: 15/261,940

(22) Filed: Sep. 10, 2016

(65) Prior Publication Data

US 2017/0078447 A1 Mar. 16, 2017

Related U.S. Application Data

(60) Provisional application No. 62/217,010, filed on Sep. 10, 2015.

(51) Int. Cl.
| | |
|---|---|
| *G06F 1/20* | (2006.01) |
| *H04W 4/80* | (2018.01) |
| *H04L 29/06* | (2006.01) |
| *H04L 29/08* | (2006.01) |
| *G06F 1/16* | (2006.01) |
| *G06F 1/3215* | (2019.01) |

(Continued)

(52) U.S. Cl.
CPC .............. *H04L 67/38* (2013.01); *G06F 1/163* (2013.01); *G06F 1/206* (2013.01); *G06F 1/3215* (2013.01); *G06F 1/3265* (2013.01); *G06F 3/011* (2013.01); *G06F 3/013* (2013.01); *H04L 65/403* (2013.01); *H04L 65/4084* (2013.01); *H04L 65/80* (2013.01); *H04L 67/141* (2013.01); *H04N 21/00* (2013.01); *H04N 21/4402* (2013.01); *H04N 21/4424* (2013.01); *H04N 21/4436* (2013.01); *H04W 4/80* (2018.02); *H04L 67/322* (2013.01)

(58) Field of Classification Search
None
See application file for complete search history.

(56) References Cited

U.S. PATENT DOCUMENTS

| | | | |
|---|---|---|---|
| 5,659,691 | A | 8/1997 | Durward et al. |
| 6,118,456 | A | 9/2000 | Cooper |

(Continued)

OTHER PUBLICATIONS

"Rasterization," Wikimedia Foundation, Inc., Aug. 10, 2016.
(Continued)

*Primary Examiner* — Brian Whipple
(74) *Attorney, Agent, or Firm* — Weiss & Arons LLP

(57) ABSTRACT

Apparatus and methods are provided for distributing linear and interactive virtual reality ("VR") video content. The VR content may be distributed by streaming over varying consumer network connections such as Wi-Fi, LTE Wireless Radio, or wired network connections. Bandwidth and latency may vary from network-user to network-user and may also vary widely during the playback of the VR content as other network users vary their bandwidth usage. Apparatus and methods are provided for ingesting, managing, composing, tracking, and experiencing VR content. Apparatus and methods are provided for reducing bandwidth and computational overhead associated with streaming VR content to a viewing device.

27 Claims, 19 Drawing Sheets

(51) Int. Cl.
*G06F 1/3234* (2019.01)
*G06F 3/01* (2006.01)
*H04N 21/00* (2011.01)
*H04N 21/4402* (2011.01)
*H04N 21/442* (2011.01)
*H04N 21/443* (2011.01)

(56) References Cited

U.S. PATENT DOCUMENTS

| | | | |
|---|---|---|---|
| 7,084,876 B1 | 8/2006 | Fogel et al. | |
| 7,480,727 B2 | 1/2009 | Domschitz | |
| 7,696,992 B2 | 4/2010 | Gyorfi et al. | |
| 7,973,786 B2 | 7/2011 | Gyorfi et al. | |
| 8,000,328 B1* | 8/2011 | Kandekar | H04L 45/54 370/392 |
| 8,135,018 B1* | 3/2012 | Kandekar | A63F 13/352 370/395.31 |
| 8,612,196 B2 | 12/2013 | Rosedale et al. | |
| 2009/0019496 A1* | 1/2009 | Amira | H04N 7/17318 725/61 |
| 2012/0021835 A1* | 1/2012 | Keller | H04L 67/38 463/42 |
| 2013/0117377 A1 | 5/2013 | Miller | |
| 2013/0162677 A1 | 6/2013 | Maaradji et al. | |
| 2013/0332510 A1 | 12/2013 | Pritchett | |
| 2014/0195807 A1* | 7/2014 | Bar-El | H04L 9/0877 713/168 |
| 2014/0321561 A1 | 10/2014 | Stec et al. | |
| 2015/0007057 A1* | 1/2015 | Zhu | H04L 65/403 715/753 |
| 2015/0032838 A1* | 1/2015 | Demsey | H04L 67/2842 709/213 |
| 2016/0101356 A1* | 4/2016 | Kuo | H04N 21/4781 345/420 |

OTHER PUBLICATIONS

"Rendering (Computer Graphics)," Wikimedia Foundation, Inc., Aug. 2, 2016.
"Raster Graphics," Wikimedia Foundation, Inc., Jul. 24, 2016.
Matroska Diagram, https://web.archive.org/web/20141024091158/ https://matroska.org/technical/diagram/index.html, Oct. 24, 2014.
Kuzyakov et al., "Next-Generation Video Encoding Techniques for 360 Video and VR," https://code.fb.com/virtual-reality/next-generation-video-encoding-techniques-for-360-video, Jan. 21, 2016.

\* cited by examiner

ADAPTIVE STREAMING OF VIRTUAL REALITY DATA

CROSS-REFERENCE TO OTHER APPLICATIONS

This application is a nonprovisional of U.S. Application No. 62/217,010, which was filed on Sep. 10, 2015, and is hereby incorporated by reference herein in its entirety.

FIELD OF TECHNOLOGY

This disclosure relates to experiencing virtual reality ("VR") content.

BACKGROUND OF THE DISCLOSURE

VR content provides an "immersive experience." VR content may include video and audio data. VR content may include cinematic films. A consumer of VR content (hereinafter, "viewer") may look in different directions and experience different objects, narratives and/or sounds. VR content allows viewers to perceive between three and six directions and/or degrees of freedom. When experiencing VR content, the displayed video content may shift in response to the viewer looking up, down and side-to-side (pitch, yaw and roll). When experiencing VR content, the displayed video content may shift in response to movement of the viewer in a direction. Experiencing VR content typically requires specialized equipment to provide the desired immersive experience. Such specialized equipment may include wearable headsets and/or specialized processors. But, wherever and however experienced, a local copy of the VR content is typically obtained beforehand.

Typically, electronic data files storing VR content are large. For example, viewing VR content may require 750 mb-1 gb per minute of video data.

A "download before you experience" model has drawbacks. The viewer has to download an entire file before it can be viewed. VR data files are large and may take a relatively long time to download. Download times may be further slowed as a result of Internet Service Providers ("ISPs") assigning a lower transmission priority to larger files.

Furthermore, a viewer must have available storage capacity to store the VR content. Stored VR data may remain on the viewing device even after the VR data has been viewed resulting in less available storage capacity for the viewer's other needs.

Sales of devices capable of VR content playback have been increasing. Piper Jaffray Investment Research (May 2015) predicts that sales of VR headsets will reach 12 million by the end of 2016.

VR headsets are increasingly operative with other common mobile devices. For example, current VR headsets utilize the screens and processing power of a viewer's smartphone or other mobile device. VR headsets and mobile devices typically operate on battery power. Viewing VR content may require intensive image processing power, which reduces battery life expectancy of a mobile viewing device.

Demand for access to VR content has been increasing. Viewers are expected to increase demand for on-demand high quality VR content. Viewers are further expected to demand a wide range of well organized, high-quality VR content that is viewable on the hardware device of their choice.

It would be desirable therefore to provide apparatus and methods for viewing VR content in a manner that provides a viewer with an immersive on-demand VR experience. It would further be desirable to provide producers of VR content a device-agnostic platform on which their content can be premiered and monetized.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
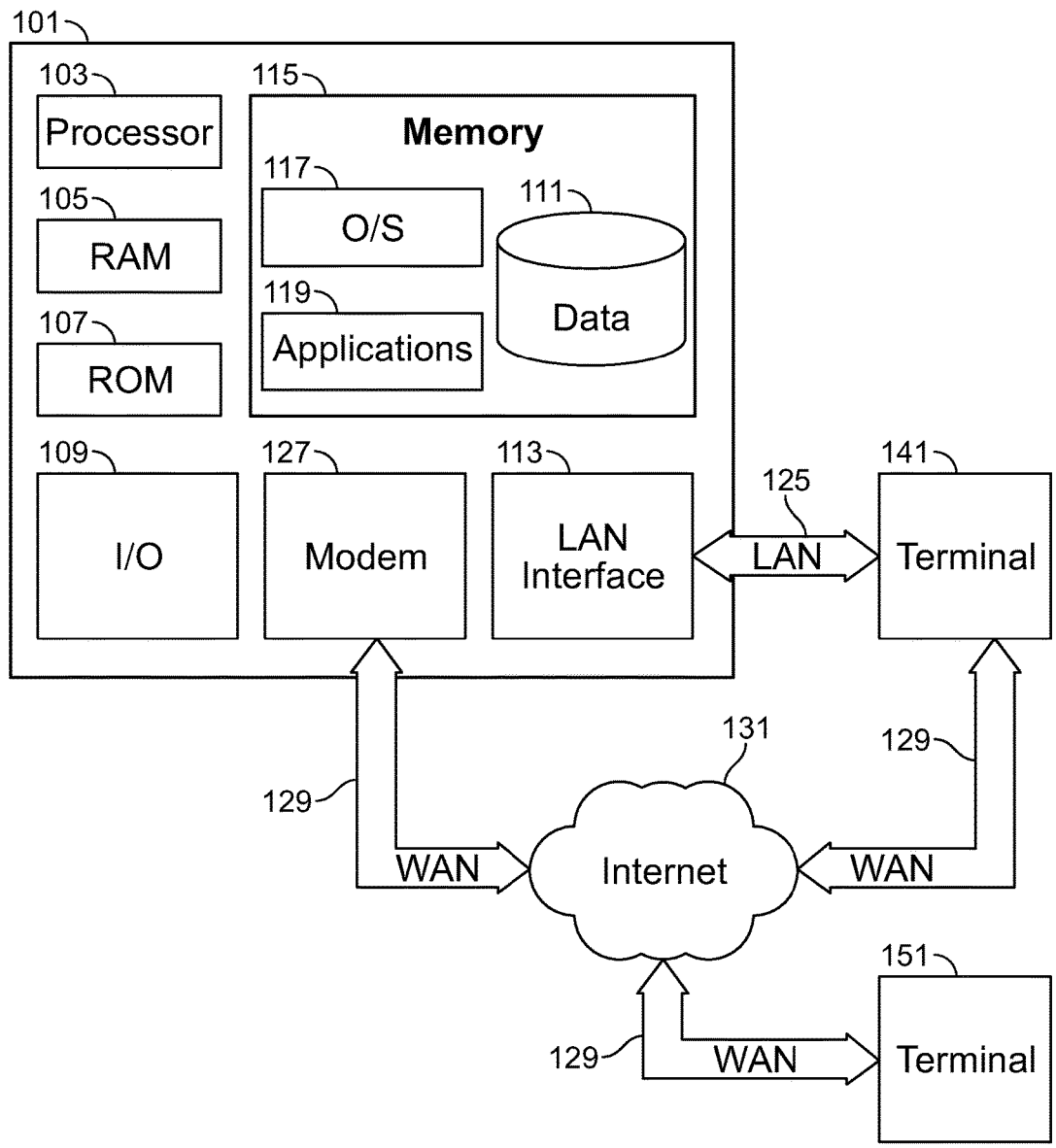
FIG. 1 shows illustrative apparatus in accordance with principles of the invention.

Apparatus and methods for experiencing VR content are provided. Apparatus may include infrastructure and related client software to ingest, manage, compose, access control, distribute, track, and consume VR content.

VR content may include a plurality of "assets." The plurality of assets may form a VR film or movie. Assets may include one more data files. Assets may include video data, audio data, touch data or smell data. For example, a screen or other component of a viewing device may contour in response to touch data included in a VR asset.

Assets may include stereoscopic video data. The stereoscopic video data may include first video data. The stereoscopic video data may include second video data. The first video data may be streamed to a viewer's right eye. The second video data may be streamed to a viewer's left eye. The first video data and the second video data may be displayed on one screen. The stereoscopic video data may allow a viewer to perceive depth or 3D spaces when experiencing VR content.

Assets may include vector objects. Vector objects may include complete representations of 3D objects. Assets may include 2D objects. The 2D objects may include text overlay information with coordinates to position planar objects (that may have text on them) into a 3D space (the objects themselves may not be 3D vectors, just 2D.) Using stereography, a viewer may perceive a 2D object as being positioned at a depth relative to another VR asset.

Assets may be grouped into narrative nodes. Assets may be used to construct a VR scene or frame. Each narrative node may represent a narrative sequence of the VR content. Each narrative node may include video, audio or any suitable data files storing information for conveying a narrative experience or sequence of events. VR content may include one or more narrative nodes.

A narrative path may link two or more narrative nodes. Each narrative node may be linked to one or more other narrative nodes within the VR content by a narrative path.

VR content may include two or more narrative paths. VR content may be described as "multilinear." A traditional 2D or "flat film" may be characterized as "linear." In flat films, a viewer is shown identical content each time the flat film is viewed. VR content may allow the viewer to access different combinations of narrative nodes via different narrative paths and thereby control how the viewer experiences the VR content.

An asset may be interactive. For example, a viewer, by focusing on one or more data segments associated with a first narrative node, may trigger a network call to stream data segments associated with a second narrative node. Had the viewer focused on other data segments associated with the first narrative node, the viewer may have triggered a network call to stream segments associated with a third narrative node. A viewer, by focusing or otherwise demonstrating interest in particular data segments, may trigger streaming of VR content that follows one or more narrative paths associated with the VR content. Viewer focus may be detected by head, hand or other body movement of the viewer.

Apparatus and methods may include a composer. The composer may provide tools for VR content producers to create VR content that allows viewers to make one or more narrative decisions while experiencing VR content. A narrative decision may trigger a transition to progress from one narrative node to another narrative node. A viewer decision may be determined based on a viewer focus. A viewer decision may be determined based on a change in viewer focus.

The composer may include a browser based node editor that allows a content producer to define multi-path narratives, add spatial audio, and to add interactivity in the form of audio and narrative path triggers. The composer may generate a JSON file output.

Apparatus and methods may include a multiple path narrative editor. The editor may include a graphical user interface. The interface may allow VR content producers to build complex narratives using VR assets.

A possible solution to the "download before you view" model is to stream VR content to the viewer on-demand. A streaming model may include storing the VR content at a location remote from the viewer. As a result of the large file sizes, it has been challenging to implement on-demand streaming of VR content.

Apparatus and methods for adaptive streaming of VR content are provided. A gap between a network location storing the VR content and the viewing device introduces substantially varying conditions such as varying bandwidth, latency, and resource unavailability.

As a result of the large size of VR data files, streaming VR content may "choke" the viewer's network connection by consuming much of the viewer's available bandwidth. Streaming the VR content may result in a "choppy" viewing experience.

A "smooth" VR experience may demand a low-latency response to viewer head or body movement. For example, unless latency is 50 ms or less, the viewer may visually sense a delay between a head/body movement and a responsive change to displayed VR content. The desired latency may be difficult to achieve when streaming the large amount of data typically associated with VR content.

Moreover, as a result of the large size of VR files, a network operator may assign VR content a lower priority relative to other data transfers over the network. When experiencing VR content, a viewer may look in different directions to observe different aspects of the VR content. A large data flow and insufficient bandwidth may result in part of the VR content outside a viewer's current field of view being unavailable when the viewer shifts focus.

Streaming VR content may provide "on demand" VR content to requesting viewers. Streaming VR content may include storing the VR content at a location remote from the viewer.

Apparatus and methods may allow a viewer to experience VR assets associated with one or more narrative nodes by monitoring a focal point of the viewer. A change in the focal point of the viewer may be determined by detected head, body or eye motion of the viewer. Eye motion may be detected based on eye movement relative to a screen of the viewing device or other suitable frame of reference.

The viewer focal point may be a focal area. A focal area may include VR content mapped onto a surface of a spherical-hull. The VR content may be mapped onto a specific location of the surface. The viewer may perceive VR content as being mapped onto a surface of a spherical-hull centered about the viewer. The spherical-hull may be an imaginary or virtual construct. The spherical-hull may be used as a frame-of-reference. For example, when viewing VR content, the viewer may perceive to be enveloped by the VR content mapped onto the surface of the spherical-hull. Apparatus and method may determine VR content to be displayed to the viewer based on a focal position of the viewer with respect to a surface of a virtual spherical-hull that envelopes the viewer.

As further example, the spherical-hull may be used as a frame-of-reference when viewing a visual display to registered metadata associated with VR content.

The focal area may include VR content visible within a field-of-view of the viewer. A size of the field-of-view may differ based on the viewing device used by the viewer. The field-of-view visible to the viewer may be defined based on VR content visible to the viewer when the viewer is immobile.

The focal area may correspond to a location on a surface of a spherical projection displayed to the viewer. Before being presented to a viewer, VR content may be mapped onto a spherical projection. The projection may be a projection of a spherical surface. The spherical projection may include displaying data that describes a 3D image on a planar or 2D surface. A screen may be a planar or 2D surface. The screen may include a computer screen, head-mounted display or the screen of a mobile device. The spherical projection may be generated based on the mapping of VR content onto the surface of the spherical-hull. The spherical projection may be presented to the viewer in stereoscopic form.

The viewer may experience different VR content in response to head, eye or body movement. In response to detecting the body movement, the different VR content may be streamed and/or displayed to the viewer. In response to body movement, the viewer may perceive VR content mapped onto different locations on the spherical-hull. Thus the viewer may experience different VR content when looking in any of between three and six different directions, feeling as if the VR content envelopes the viewer. Mapping VR content on the spherical-hull may create an illusion that the viewer is surrounded or immersed in displayed VR content.

VR content may be presented in stereoscopic form. In stereoscopic form, a stereo image pair is displayed side-by-side on a screen. Stereoscopic form may include splitting a screen of a viewing device. A first surface area of the screen may display VR content for display to the viewer's right eye. A second surface area of the screen may display VR content for display to the viewer's left eye.

When the stereo image pair is presented up close to the viewer, the two images substantially correspond to a viewer's left eye view and right eye view. Lenses in the viewing device may allow the viewer's eyes to focus on the stereoscopic VR content up close. The lenses may magnify the stereoscopic VR content to fill the viewer's field-of-view, creating an illusion of 3D spaces and objects.

For example, video assets may include stereoscopic data. The stereoscopic data may include two 2D data streams. Each data stream may be designed to be wrapped around a surface of a spherical-hull. A right eye of the viewer may perceive VR content from a first stream mapped onto a first spherical-hull. A left eye of the viewer may perceive a second stream mapped onto a second spherical-hull. The data streams may include information to cause the viewer's brain to interpret 3D spaces through the "trick" of stereoscopic projection. A viewing device may present the two data streams to the viewer in a manner that allows the viewer to perceive 3D spaces.

A device for viewing VR content may be configured to detect a viewer focal point. A viewing device may include a headset worn by the viewer. The headset may use hardware such as a magnetometer, accelerometer and/or gyroscope to detect motion/orientation of the headset. A headset may include hardware such as IR cameras to detect a physical location of the viewer in a three-dimensional space.

The headset may include lenses designed for viewing VR content in stereoscopic form. The headset may be designed to be used with a detachable mobile device. The detachable mobile device may include a smartphone or phablet of the viewer. The detachable mobile device may include a screen, a magnetometer, accelerometer and/or gyroscope to detect motion/orientation of the viewer. Exemplary headsets may include the Oculus Rift, Samsung Gear VR, HTC Vive or Google "Cardboard."

A viewer's focal point may be monitored based on a position of the viewer's head or other body part with respect to orientation of a viewing device. A position of the viewer's focal point may be correlated to a surface area (and VR content mapped thereon) of a spherical-hull perceived by the viewer. A position of the viewer's focal point may be correlated to a surface area (and VR content mapped thereon) of a spherical projection displayed to the viewer. While the viewer is experiencing the VR content, the viewing device may detect and monitor a position of the viewer's focal point and shifts in the focal point.

For example, if a viewer focuses on specific VR content, the narrative sequence may progress based on the VR content mapped or otherwise associated with the viewer's focal point. The specific VR content may be identified based on a location of the VR content on a surface area of a screen that presents the VR content to the viewer. The specific VR content may be identified based on a location of the VR content on a surface of a spherical-hull that is perceived by the viewer to envelope the viewer.

A first viewer may progress down a different narrative pathway from a second viewer that missed or did not focus on the pathway taken by the first viewer. A position or changes in position, of a viewer focal point may be experienced by the viewer as perceiving VR content mapped onto different locations on a surface of the spherical-hull enveloping the viewer.

VR Assets associated with a narrative node may be stored in different locations remote from a viewing device. Such a location may be termed a Content Delivery Network ("CDN"). Each CDN may include one or more copies of an asset. Each copy of an asset may be of a different resolution. For example, video assets of a lower resolution may be smaller in size than a higher resolution asset. Each copy of an asset may be of a different format. Different viewing devices may request data files or assets in different formats.

One or more assets storing video and/or audio data in different resolutions may be termed a "rendition." A rendition may be associated with a manifest file. The manifest file may include a "roadmap" for associating a plurality of VR assets with a rendition. The manifest file may provide predictive model for when a particular asset might be needed during playback of VR content, regardless of interactive aspects.

Each asset may be sectioned into one, two or more data segments. A section or a portion of a VR asset may include the entire asset, less than the entire asset or two or more assets. A data segment may correspond to an entire asset, less than the entire asset or two or more assets. Thus one data segment may include an entire asset, less than the entire asset or two or more assets. Each data segment may correspond to a planar surface area of a spherical projection of VR content displayed to a viewer by a viewing device. Each data segment may correspond to VR content mapped onto a surface area of the spherical-hull perceived by the viewer. For example, a surface of a spherical-hull may be section into surface areas that may be "filled" by one or more data segments. In response to a request received from a viewing device for on-demand streaming of VR content, data segments associated with assets of the VR content may be streamed to the requesting viewer. The streamed data segments may be mapped onto a surface of a spherical-hull perceived by the viewer.

A set of data segments may represent a VR asset. A VR asset may include data segments that are stitched together by a producer of the VR content. Each video asset associated with VR content may be segmented into 1, 2, 3, 4, 5, 6 or more data segments.

Sectioning an asset into data segments, or defining an asset based on data segments, may allow for selective segment-by-segment streaming of the asset. Each data segment may correspond to a small amount of information relative to the complete asset. Smaller amounts of information may be transmitted faster and more efficient than larger chunks of information. Segment-by-segment streaming may allow the apparatus and methods for streaming VR content to maintain a threshold level of quality of service for a given bandwidth and/or device. Segment-by-segment streaming may allow VR content to be streamed with lower latency.

Each data segment associated with VR content may be streamed to a requesting viewing device from a different location. Streamed data segments may be of differing resolutions. Data segments may be streamed at different bit rates.

For example, when a viewing device requests delivery of VR content, apparatus may determine a location of the viewing device. Apparatus may select a location (e.g., a CDN) storing one or more narrative nodes of the VR content. The location may be selected based on a geographic location of the viewing device. The viewing device may receive VR content from a CDN geographically close to the viewing device.

Multiple storage locations may be identified. Each of the identified locations may stream different assets of the VR content to the viewing device. Different narrative node may be streamed from different locations. Different data segments may be streamed to a viewing device from different geographical locations. The different locations may be identified based on bandwidth available to the requesting device, performance characteristics of the requesting device or any other suitable characteristic or combination of characteristics.

Apparatus may switch or multiplex between two or more renditions and/or CDNs. Switching or multiplexing may be based on available bandwidth or other performance characteristics. Switching may include streaming data to a viewer from different renditions and/or CDNs while the viewer is experiencing VR content.

For example, VR content may be presented to viewer in stereoscopic form. Data segments streamed to the viewer's right eye may be sourced from a first CDN and data segments streamed to the viewer's left eye may be sourced from a second CDN. Data segments streamed to the viewer's right eye may be sourced from a first rendition and data segments streamed to the viewer's left eye may be sourced from a second rendition.

A rendition and/or CDN may be selected based on one or more performance characteristics of the device used to submit a request for streaming the VR content. For example, renditions may be stored in file formats that are efficiently processed by graphic processing units used by a specific device manufacturer.

Different data segments streamed to the viewer may be extracted from different renditions. Each of the renditions may include VR content in a different resolution. Thus, different data segment streamed to the viewer may be of different resolutions. Streaming different data segments of differing resolutions may increase a number of "network calls" over the network linking the viewing device and remotely stored VR content. Numerous requests for multiple small-sized data segments may be processed or transferred faster over a network than fewer requests for larger-sized quantities of VR content. In some embodiments, multiple data segments may be placed into a single bit-stream. Faster processing may improve performance of VR content streaming. Improved performance may include lower latency and more efficient use of available bandwidth.

Apparatus and methods may be configured to coordinate streaming and network calls to different renditions of VR content to provide the viewer with a low latency VR experience. A low latency VR experience may be provided by appearing to the viewer to maintain a smooth flow of VR content regardless of shifts in the viewer focal point. A low latency VR experience may include smooth switching between VR assets, narrative nodes or data segments. Switching may be triggered by performance considerations, viewer body movement and/or narrative considerations associated with the VR content.

Performance considerations may include available bandwidth, network provider, viewing device hardware/software, number of network calls, type of VR assets, locations of the assets, viewing device battery life. Narrative considerations may include number of narrative nodes in the VR content, rate of change between nodes, changes in viewer focus, narrative paths between nodes, registered metadata associated with the VR content or any other suitable narrative considerations. Switching may be based on one or more performance considerations and/or one or more narrative considerations.

Apparatus and methods for VR content streaming may include a VR content streaming platform. The platform may be viewing device agnostic. The streaming platform may include an "app" or other software running on a viewing device.

Streaming performance improvements may be realized by compressing VR content. Apparatus and methods may include utilizing various compression techniques. For example, apparatus and methods may include utilizing 60% lossy compression. Apparatus and methods may include utilizing 90% lossless video compression. Streaming compressed VR content may result in faster streaming and downloading times. Streaming compressed VR content may require less bandwidth for streaming a given quantity of VR content.

Streamed data segments may be received at the viewing device. The viewing device may process and display the received data segments. The viewing device may include computational processing units such as a central processing unit, graphics processing unit or other suitable chipsets.

The received data segments may be queued in one or more buffers on the viewing device. The buffers may be synchronized to provide the viewer with an immersive VR experience. The buffers may be synchronized to display to the viewer data segments of differing resolutions at different positions on a screen of a viewing device.

For example, data segments expected to be positioned outside a field-of-view of the viewer may be streamed at a lower resolution than data segments expected to be within the field-of-view. Data segments expected to be positioned within the field-of-view may be streamed and/or queued at a faster rate, and in larger numbers than data segments expected to be outside the field-of-view.

An expected position of a data segment may be determined based on reactions of one or more viewers to previously streamed instances of the VR content. The reactions of viewers to a display of VR content may be detected based on monitoring and registering attributes or other metadata associated with displayed VR content. Registered metadata may be associated with one or more data segments or narrative nodes of the VR content.

Illustrative metadata may include:

Position relative to a viewer focal point/area;

Position of first data segment relative to a second data segment;

Temporal position within narrative node or overall VR content;

Displayed resolution;

Current bandwidth usage;

Viewer demographic information;

Demographic data associated with a geographic location; and/or

Characteristic of viewing device.

For example, an expected position (e.g., on a screen, on a surface of a spherical-hull or with respect to viewer focal point) or resolution of a data segment may be determined by registering metadata associated with playback of the VR content. Systems and methods may register metadata each time the VR content is streamed to a viewer.

Registered metadata may be utilized to generate analyses of the VR content.

Analysis of registered metadata may include determining where (e.g., position on a device screen or position with respect to viewer focal point) a data segment is presented, when (timing) a data segment (relative to entire VR content or with respect to the viewing device) is presented or a narrative path (e.g., node-to-node) taken by one or more viewers of the VR content. Apparatus and methods may include registering any suitable metadata associated with displayed or streamed VR content.

VR content may be colored or otherwise visually marked based on registered metadata associated with the VR content. A result of metadata analysis may be visually displayed as a "heat map." Based on analysis of registered metadata, shading or coloration may be applied to VR content to visually show narrative choices made by viewers when experiencing the VR content.

Heat maps may be used to show how many viewers focused on assets, data segments, or other components of VR content. Heat maps may be used to show how much time viewers spent focused on one or more assets of the VR content. For example, a VR producer may watch VR content with a heat map overlay and visually identify VR assets, data segments, narrative nodes or narrative paths that captured the attention of viewers. In some embodiments, a heat map based on registered metadata may be overlaid on 2D viewing screen.

Registered metadata may provide information corresponding to viewer's reactions to events depicted by the VR content. For example, data segment associated with a high frequency of viewer focus shifts may be visually marked. Registered metadata may be made available to VR content producers through an application program interface ("API"). Using the API, the producers may run their own tests and campaigns based on registered metadata.

Streamed VR content may be decoded and buffered by the viewing device. The buffered VR content may be rendered. Rendered VR content may be displayed to the viewer. Rendering the VR content may include mapping the VR content onto a surface of a spherical-hull.

Typically, the rendering and mapping are processing intensive tasks. Processing intensive tasks may reduce battery life and increase latency when viewing VR content.

Embodiments may include streaming VR content that is designed to be mapped onto a surface of a spherical-hull. For example, the VR content may include a 2D spherical projection. The spherical projection allows the VR content to be displayed stereographically and/or stereoscopically on a 2D screen of the viewing device. Moreover, by streaming a 2D projection and then mapping the 2D projection onto a spherical-hull may allow the VR content to be streamed over a communication channel at higher resolutions with lower latency.

Apparatus and methods may include applying shaders to VR content. The shaders may be applied to VR content received by a viewing device. The shaders may include software executable by the viewing device. The shaders may be configured to turn 2D data received by the viewing device into a section of a spherical-hull. The shaders receive 2D data (the received VR content) and 3D data (the section of the spherical-hull as a vector) and process the inputs, outputting a 3D object. The section of the spherical-hull may be a location on the spherical-hull perceived, by a viewer, to envelope the viewer.

Application of the shaders may distort received VR content. For example, applying shaders to a 2D data file may allow the content of the 2D file to be displayed on a screen and perceived by a viewer as being associated with three dimensions.

The shaders may be applied to individual data segments. The shaders may be applied to all data segments that are associated with a narrative node. The shaders may be applied to the entire VR content. The shaders may be applied by the viewing device to VR content received from a CDN or offline/locally stored VR content.

Application of the shaders by the viewing device may reduce an amount of information streamed to the viewing device. Application of the shaders may reduce the intensity of processing associated with rendering and mapping.

Application of shaders may reduce bandwidth usage and improve streaming performance by transferring 2D files to the viewing device. 2D files may be smaller in size than a typical 3D data file. After application of the shaders by the viewing device, the 2D file may be transformed and/or distorted and perceived by a viewer as being associated with three dimensions. Application of shaders may allow VR content to be streamed as a 2D file and provide an immersive VR experience to the viewer (e.g., the viewer feeling as if he/she is in the center of a VR experience). Application of shaders may reduce the amount of data that must be streamed to experience immersive VR content.

Apparatus and methods may include "static partial object rendering." Static partial object rendering may include rendering VR content that includes 3D data for display on a 2D screen of a viewing device. Static partial object rendering may include configuring VR content to be displayed at a position on a surface of a spherical-hull. For example, the static partial object rendering may position VR content using latitude and longitude of the spherical-hull. Static partial object rendering may include configuring VR content to be displayed at a distance from a center of a surface of a spherical-hull. For example, the static partial object rendering may include resizing an object to generate a perception of the object being spaced a distance from the center of the spherical-hull.

Static partial object rendering may include generating 2D data based on 3D VR content. For example, static partial object rendering may include generating a 2D spherical projection based on VR content captured in 3D.

Apparatus and methods for static partial object rendering may include rendering specific data segments associated with VR content. The specific data segments may be less than all of the VR content. The specific data segments may be determined based on registered metadata associated with VR content.

The specific data segments may be associated with a location on the spherical-hull that envelopes a viewer. Rendering specific data segments may correspond to rendering less data than rendering all the data associated with the entire spherical-hull. Rendering less than the entire spherical-hull may reduce CPU and GPU demands and extend battery life of the viewing device.

For example, data segments corresponding to events occurring at a location on the spherical-hull (as perceived by the viewer) behind a viewer's head may be less likely to be viewed when there is an event happening at a location on the spherical-hull that is in front of the viewer. The surface or location that is behind a viewer may be determined based on a detected focal point of the viewer. A change in the focal point may be translated to moving to a new position on the spherical-hull that envelopes a viewer. An adaptive streaming model may not render the data segments corresponding to the data segments mapped to a surface behind the viewer as finely or in a resolution as high as for data segments mapped to surface space in the front of viewer. An adaptive streaming model may not render the data segments corresponding to the data segments mapped to a surface behind the viewer at all.

Registered metadata associated with VR content may be used to determine specific data segments that are rendered at a given time, for a given narrative node or for a given narrative path. Adaptive streaming methods and systems may be combined with analysis of the metadata to determine the spherical surface areas that are more likely to be viewed. Systems and methods may render VR content at both relatively higher and lower resolutions. Rendering the VR content at differing resolution may yield efficient processing/load times and efficient bandwidth usage.

For example, analysis of registered metadata previously obtained from other viewers of the VR content may be used to determine spatial areas (and corresponding data segments) that are more likely to be viewed than others. The metadata analysis may identify commonly followed narrative paths through the VR content. The commonly followed narrative paths may be prioritized for high resolution and low latency display when streaming the VR content to a viewer. Apparatus and methods may dynamically respond to viewer decisions to follow infrequently taken narrative paths and adjust data segments selected for streaming and rendering accordingly.

Apparatus and methods for adaptively streaming VR content are provided. One or more method steps may be performed by a "system." The "system" may include hardware components, software components and/or a combination of software and hardware components.

Methods may include receiving a request from a viewing device. The viewing device may request that VR content be streamed from a location remote to a viewing device. The viewing device may be a mobile device. Exemplary mobile devices may include a VR headset (e.g. Oculus Rift or Samsung Gear VR), smartphone, phablet, tablet and/or laptop computer. The viewing device may be a computer or any other suitable device. The viewing device may transmit the request for VR content to the remote location over a network. The network may include one or more networks.

In response to receiving the request, the system may identify a rendition of the VR content. A rendition of the VR content may be stored on a CDN. One or more renditions of the VR content may be stored in one or more locations. The rendition may be identified based on a location of requesting viewing device. The rendition may be an electronic file.

The rendition may be identified based on available bandwidth across a network linking the requesting viewing device to the location where the rendition is stored. For example, different renditions may include different resolutions and different formats/sizes. A rendition having a lower resolution may be identified if the request is received over a network with less available bandwidth. The system may adaptively identify a rendition based on a real time monitoring of bandwidth available across a network path linking the requesting the device to the location of one or more renditions.

In some embodiments, the system may be configured to detect an alternative network path linking the requesting viewing device and a rendition of VR content. The system may be configured to switch, mid-stream, to the alternative network path. Using the alternative network path may allow the system to stream a higher resolution rendition or stream a rendition at a faster data transfer rate.

The system may be configured to identify the rendition based on one or more performance characteristics of the viewing device. For example, the system may be configured to identify a rendition based on a processor, memory, decoder, graphics processor or any other suitable components of the requesting viewing device.

Methods may include extracting a set of data segments from a rendition. Methods may include streaming the set of data segments to the requesting viewing device. Methods may include queuing the set of data segments in an array of buffers on the viewing device. Each buffer may be associated with an expected position with respect to an actual or expected focal point of a viewer. An expected focal may be determined based on registered metadata associated with VR content.

For example, buffers associated with a position closer to an expected focal point may be filled to higher capacity than buffers more distant from the expected focal point. Buffers closer to the expected viewer focal point may be filled with higher resolution data segments than buffers more distant from the expected focal point. Buffers closer to the expected focal point may be refreshed at a higher rate than buffers more distant from the expected focal point. An expected viewer focal may also be adjusted in real-time based on body movements of a viewer.

The first set of data segments may include a plurality of data segments. Each data segment may be a member of the first set. A portion of a set of data segments may include the entire set, less than the entire set or one data segment. Thus a portion of a set of data segments may include one data segment, two or more data segments, or the entire set of data segments. Methods may include projecting a first portion of the set of data segments onto a screen of the viewing device. The first portion may correspond to a field-of-view surrounding the focal point of the viewer. The first portion may include one or more stereoscopic views.

For example, the projection may include a distinct left eye display and a distinct right eye display. The methods may include using the screen of the viewing device, displaying data segments that correspond to the left eye and/or right eye stereoscopic views. The first set of data segments may correspond to left eye and/or right eye stereoscopic views.

The set of data segments may be a first set. In response to a shifting of the viewer focal point, methods may include extracting a second set of data segments from a rendition. The second set of data segments may be extracted from a different rendition. The different rendition may be stored at a different location. The second set of video segments may be associated with a second narrative node of the VR content. The second node may be narratively linked to the first node. A narrative path linking the first and second nodes may be defined in a manifest file associated with the VR content.

The second set of data segments may be of a lower resolution than the first set of data segments. The second set of data segments may be stored on the viewing device. The second set of data segments may be displayed to the viewer in response to a sudden shift in the viewer's focal point. Even in response to a sudden shift in the viewer's focal point, VR content, albeit lower resolution content, may be displayed to the viewer.

Methods may include projecting a second portion of the set of data segments onto the screen in response to a shifting of a viewer focal point away from a first portion of the set of video segments. The second portion may be associated with a higher, lower or identical resolution as the first portion. The first portion and the second portion may each depict VR content associated with a narrative node.

Methods may include streaming the second set of data segments to the viewing device. Methods may include queuing the second set of data segments in the array of buffers. The second set of data segments may be queued in the buffers such that in response to a shifting of the viewer focal point away from the second portion of the first set of data segments, the second set of data segments are configured to replace, on the screen, a portion of the first set of data segments.

Methods may include sensing available bandwidth on a network path or connection linking the requesting viewing device to remote location storing renditions associated with the VR content. Based on the available bandwidth, methods may include selecting a first rendition associated with the VR content. Methods may include transmitting a first set of data segments to a device of a viewer. The first set of data segments may be extracted from the first rendition.

Methods may include monitoring a focal point of the viewer. The focal point of the viewer may be monitored based on head, eye, hand, neck, torso or other body movement of the viewer. A viewer's focal point may be monitored based on a position of the viewer's head with respect to orientation of the device. A viewer's focal point may be monitored based on a position of the viewer's eyes with respect to a screen of the device. The focal point of the viewer may be monitored relative to a spherical-hull enveloping the viewer. The focal point of the viewer may be monitored relative a display of at least a portion of the first set of data segments.

The viewing device may include a headset worn by the viewer. The headset may include a detachable mobile device. The headset may use hardware such as a magnetometer, accelerometer and/or, gyroscope or infrared sensors to detect motion/orientation of the headset or viewer's body. Exemplary headsets may include the Oculus Rift and Samsung Gear VR. In response to detecting a change in the viewer focal point, methods may include transmitting a second set of data segments to the viewing device. The second set of data segments may be extracted from the first rendition. The second set of data segments may be associated with a second rendition associated with the VR content.

The first and second renditions may include the same narrative VR content in different resolutions. The first set of data segments may be associated with a first resolution. The second set of data segments may be associated with a second resolution. Within a single rendition, different data segments correspond to VR video that is displayed to the viewer in different resolutions.

For example, a first portion of the first set of data segments may be associated with a first resolution. A second portion of the first set of data segments may be associated with a second resolution.

The second set of data segments may be narratively linked to the first set of data segments. For example, the first set of data segments may be associated with a first narrative node. The second set of data segments may be associated with a second narrative node. The narrative link and/or link between narrative nodes may be specified in a manifest file associated with the VR content.

Methods may include transmitting audio data to the viewing device. The audio data may be a VR asset. The audio data may be associated with the first set of data segments. The audio data may be played to the viewer in response to a detection of a focal point of the viewer on or near a data segment associated with the audio data. An association between the audio data and the data segment may be specified in a manifest file.

Methods may include storing a first portion of the first set of data segments in a first buffer on the viewing device. Methods may include storing a second portion of the first set of data segments in a second buffer on the viewing device.

Methods may include replenishing the first buffer at a first refresh rate. Methods may include replenishing the second buffer at a second refresh rate. A buffer replenishment rate may be determined based on metadata associated with the VR content. For example, the refresh rate may be based on an expected focal point of a viewer within the viewer's field of view. The metadata may include registered reactions of viewers who have previously streamed and experienced the VR content. The refresh rate may be based on an expected focal point of a viewer on a spherical-hull that is perceived, by the viewer, envelope the viewer.

A refresh rate may be determined in response to a change in the focal point of a viewer. Methods may include adjusting the refresh rate in real-time in response to viewer head, eye or other body movement.

Methods may include transmitting a third set of data segments to the viewing device. The third set of data segments may be transmitted before transmitting the second set of data segments. The third set of data segments may be extracted from the first rendition file. The first, second or third set of data segments may correspond to one or more assets associated with the VR content. The methods may include selecting a set of data segments based on narrative path associated with the VR content. The narrative path may be determined based on registered metadata associated with the VR content.

In response to receiving a set of data segments, methods may include mapping the first set of data segments onto a spherical-hull. Methods may include, after the mapping, displaying on the device a first portion of the data mapped segments to the viewer at a first time. Methods may include displaying a second portion of the mapped data segments to the viewer at a second time.

A focal point of the viewer may be monitored relative a display of at least a portion of a set of data segments. Methods may include, displaying on the device, a first portion of the mapped segments in response to detection of a first focal point of the viewer on or near a first location on a surface of the spherical-hull. Methods may include, displaying a second portion of the mapped segments to the viewer in response to detection of a second focal point of the viewer on or near a second location on the surface of the spherical-hull. The displaying may occur after the mapping.

"Nearness" of a viewer focal point to a surface portion of the spherical-hull may be determined based on metadata associated with the VR content being viewed. "Nearness" of a viewer focal point to a surface portion of the spherical-hull may be determined based on VR content perceived by the viewer. VR content may be perceived by the viewer as being mapped onto a surface of a spherical-hull centered about the viewer.

Methods may include requesting transmission of the second set of data segments in response to detection of the first focal point. Methods may include displaying a portion the VR content to the viewer. The portion may include a portion of the first set of data segments and a portion of the second set of data segments. The displayed portion may include one or more video assets.

Methods may include determining a data segment size for each member of a set of data segments. A data segment size may be defined and redefined during streaming of VR content. A data segment size may be defined by a producer of the VR content. A data segment size may be defined for different narrative nodes or paths. A data segment size may be defined by apparatus and methods for streaming the VR content. The data segment size may be determined based on the bandwidth available to stream information to the viewing device.

Methods may include generating the second set of data segments based on the data segment size. Apparatus may include a system for adaptively streaming VR content. The system may include a receiver module configured to receive assets associated with the VR content. The receiver module may include a hardware component of a viewing device. The receiver module may include a software component of a viewing device. For example, a receiver module may include apparatus for receiving data over a cellular network, Wi-Fi network or Bluetooth network.

The system may include at least two buffers for storing received data segments extracted from assets associated with the VR content. In response to receiving the data segments, the viewing device may be configured to distribute: (1) a first segment of the video data to a first buffer, (2) a second segment of the video data to a second buffer and (3) a third segment of the video data to the second buffer. A central processing unit and/or graphical processing unit of the viewing device may be configured to distribute the data segments.

The system may include a processor configured to display, at a first time, a first video frame that includes the first data segment and the second data segment. The processor may be configured to display at a second time, a second frame, narratively linked to the first frame. The second frame may include the first segment and, in place of the second segment, the third segment. The first data segment may be associated with a first resolution. The second data segment is associated with a second resolution.

The viewing device may be further configured to fill the first buffer with a first number of data segments and the second buffer with a second number of data segments. The first number may be different from the second number.

The viewing device may be configured to associate the first buffer with a first position on a screen of the viewing device and the second buffer with a second position on the screen of the viewing device. The first or second positions may be defined by a memory location, a surface area of the screen and/or a number of pixels.

The viewing device may be configured to project the contents of the first buffer onto the first position on the screen and the contents of the second buffer onto the second position on the screen. The first number of data segments stored in the first buffer may be determined based on a position, change in position or expected position of a focal point of a viewer. The first and second screen positions may display VR content mapped onto different locations on the spherical-hull perceived to be enveloping the viewer during playback of VR content.

A number of data segments stored in the first buffer at the second time may be determined based on a position of a focal point of a viewer at the first time.

A number of video segments stored in the first buffer at the second time may be determined based on a number of changes in a focal point of a viewer between the first time and the second time.

A number of data segments stored in the first buffer at the second time may be determined based on a second position of the screen and an actual or expected focal point of a viewer at the first time.

The viewing device may be configured to receive one or more audio assets associated with the VR content. A first portion of an audio asset may be stored in the first buffer and a second portion of the audio asset may be stored in the second buffer. The second portion of the audio asset may be played to a viewer based on an actual or expected focal point of the viewer.

The processor may be configured to request transmission of data segments having the first or the second resolution in response to available bandwidth for receiving the VR content. The processor may be configured to request transmission of data segments at a specified quality bit rate in response to available bandwidth for receiving the VR content. A size of the third segment transmitted to the viewing device may be determined based on a change in the available bandwidth. The change in bandwidth may occur between the first time and the second time.

A size of the third data segment may be determined based on a position of a viewer focal point relative to the first data segment at first time. A size of the third segment determined based on a position or change in position of the viewer focal point between first and second times.

Apparatus may include a system for generating a VR metadata record. The metadata record may include information registered during a display of VR content to a viewer. For example, the record may include a narrative path taken by the viewer through the VR content. The record may include head, eye or other body movements of the viewer during a display or playback of VR content.

The system may include a graphical processing unit ("GPU"). The GPU may be utilized to process VR content. For example, the GPU may decompress VR content, decode VR content or any other suitable processing of VR content.

The system may include a central processing unit ("CPU"). The CPU may be utilized to process VR content. For example, on a mobile device, the CPU may decode VR content received from a remote source. The system may include a transmitter. The transmitter may include an antenna or other suitable hardware for communicating electronic information.

The viewing device may be further configured to register metadata describing a position of the viewer focal point. The metadata may describe a position of the viewer focal point with respect to a data segment and/or playback timing information. The focal point may be captured in terms of X, Y, and Z coordinates. The focal point may be captured in terms of spherical coordinates or in any suitable coordinate system.

The viewing device may be configured to generate a metadata record that includes a position of the viewer focal point and playback timing information. The captured playback timing information may be correlated to a portion of a VR asset. The position of the focal point and the playback timing information may be used to identify one or more data segments or assets displayed at or near the focal point. A transmitter of the viewing device may transmit the metadata record to a remote database.

The viewing device may be configured to capture an object depicted within VR content. For example, objects may be strategically positioned within VR content for advertising or "product placement" purposes. The object may be rendered vectorially. The object may be a rasterized 3D object. The object may be a 2D object associated with coordinates to position the 2D in a 3D space. The coordinates may be varied to position the 2D object at different positions relative to a surface of a spherical-hull that envelopes a viewer. The coordinates may be varied to position the 2D object at different positions relative to a location on the surface of a spherical-hull that envelopes a viewer.

Apparatus and methods for VR content streaming may provide tools for monetizing VR content.

For example, apparatus and methods may include providing an electronic store front that sells VR content a la carte. Apparatus and methods may include providing an adaptive streaming platform that may be "white-labeled." Apparatus and methods may include charging for use of the adaptive streaming platform, for example, 15-30 cents per Gigabyte streamed.

For example, when the viewer focuses on an object strategically positioned within the VR content, a producer of the VR content may receive a credit. When the viewer focuses on an object/service depicted within the VR content, the viewer may be presented with an option to purchase the object or service.

Monitoring a viewer's focal point with respect to the depicted object may provide data for assessing the efficacy and/or value of the displayed object and position of the object within the VR content.

The viewing device (including software executed thereon) may identify 2D or 3D objects depicted within VR content. The viewing device may detect an environmental condition depicted within the VR content. For example, the apparatus and methods may detect when the viewer has entered an enclosed area or other structures displayed to the viewer. Detection of a viewer's focal point on or near a displayed environmental condition may trigger a display of a VR asset or other specialized feedback.

A transform function for processing audio played to the viewer may be determined based on detected environmental conditions. The transform function may provide a realistic effect of the environmental condition on playback of an audio asset.

The viewing device may be configured to capture an amount of time the viewer has remained focused on one or data segments of the VR content.

The viewing device may be configured to adjust a sampling rate at which the metadata is registered. For example, the viewing device may adaptively adjust the sampling rate based on how often the viewer focal point shifts during display of VR content associated with a narrative node. In response to frequent shifts, the viewing device may increase the sampling rate. If the focal point shifts less often, the viewing device may maintain or reduce the sampling rate.

VR content may be associated with multiple narrative paths that may be taken by a viewer. The viewing device may register metadata indicating a narrative path taken by the viewer through multiple narrative nodes associated with the VR content. The narrative path may be identified based on tracking the focal point of the viewer during display of the VR content. The narrative path may be identified based on sampling the location of the viewer's focal point at different times during display of the VR content.

Methods for merging registered metadata with VR content are provided. Methods may include registering a timestamp and a position of a viewer focal point. The focal point may correspond to a location on a surface of a spherical-hull that is perceived to envelope the viewer. The location on the spherical-hull may correspond to VR content mapped to the location at the time indicated in the timestamp.

Methods may include matching the timestamp to VR content such as a portion of a VR asset. Methods may include shading or applying any suitable visual marking to the VR content corresponding to the timestamp and viewer focal point.

Methods may include registering metadata corresponding performance characteristics or features of the viewing device. Methods may include registering demographic data associated with a viewer or stored on a viewing device.

A metadata record may be one of a plurality of metadata records associated with VR content. Methods may include shading VR content based on a number of metadata records (associated with multiple viewers) that are each associated with a focal point position during display of the VR content.

Methods may include generating a graph depicting viewer reactions in response to viewed VR content. Methods may include auto indexing of registered metadata or metadata records. Metadata records may be auto indexed based on VR content, timing information, viewer focal point position, demographic information, viewing device, bandwidth or any suitable criteria.

Auto-indexing may include the viewing device uploading registered metadata. The registered metadata may be uploaded to a remote location. The remote location may include a database. At the remote location, the registered metadata may be auto-indexed based on the information stored in metadata record. For example, metadata records associated with specific VR content may be grouped together. Metadata records associated with a specific viewing device may be grouped together. Metadata records associated with particular network may be grouped together. VR content may be shaded (e.g., generate a "heat map") based on grouping of metadata records.

Apparatus and methods for streaming VR content may be responsive to metadata records associated with the VR content.

Methods for streaming playback of virtual reality ("VR") content over a network to a viewing device are provided. The method may include, during playback of the VR content on the viewing device, calculating an expected position of a viewer focal point or focal area with respect to a video frame of the VR content. A viewer focal area may correspond to a surface area of a virtual spherical-hull perceived to envelope the viewer.

A VR asset may include a plurality of data segments. The plurality of data segments may correspond to an inner surface of a spherical-hull that is perceived to surround a viewer experiencing the VR content. A plurality of video data segments that envelopes a viewer may be referred to herein as a "VR video frame" or "video frame." the plurality of video data segments may completely cover a surface area of a spherical-hull.

Based on the expected position of the focal area, the methods may include requesting a data segment of the video frame. The data segment may be stored in a rendition. The rendition may include rasterized video files. The requested the data segment may be less than a complete video frame.

When an actual position of the viewer focal area overlaps the expected position of the viewer focal area, the method may include displaying, on a screen of the viewing device, at least a subset of the data segment. The subset may correspond to a surface area associated with the data segment that is within the viewer focal area. The viewer focal area may not encompass a complete data segment. For example, the viewer focal area may straddle two or more data segments. A viewer focal area may include half of a first data segment and half of a second data segment. Portions of a data segment that are outside the viewer focal area may not be displayed on the screen.

The methods may include, based on the expected position of the viewer focal point, requesting a first data segment that comprises less than the entire video frame and a second data segment that comprises less than the entire video frame.

During the playback of the VR content, when the actual position of the focal area overlaps the expected position of the focal area, methods may include synchronizing display of a plurality of data segments associated with a video frame. Synchronizing may include displaying at least a subset of the first data segment on a first area of the screen and displaying at least a subset of the second data segment on a second area of the screen. Synchronizing may include displaying the first and second data segments at substantially the same time. The actual position of the focal area may include the first and the second areas of the screen.

Methods may include receiving the first data segment over the network at a first time. Methods may include receiving the second data segment over the network at a second time.

A data segment may be a first data segment of a video frame. A rendition of the data segment may be rasterized. The rendition may be a first rasterized rendition. The methods may include, based on an expected position of a viewer focal area, requesting a second data segment of the video frame stored in a second rasterized rendition. The second data segment may not include the entire video frame. The second data segment may be outside the expected position of the viewer focal area. The first rasterized rendition may have a resolution that is different from the second rasterized rendition. The second resolution may be lower than the first resolution.

A video frame may include a plurality of data segments. The first and second data segments may be members of the plurality. The plurality may include more than two members. Two or more data segments of a video frame may be of unequal sizes. For example, a complete video frame may be sectioned into six data segments.

Methods may include streaming each of the data segments to the viewing device in discrete bit-streams. The discrete bit-streams may be transmitted over two or more networks. Methods may include receiving each of the plurality of data segments of a video frame in a discrete bit-stream. Methods may include streaming a plurality of data segments to the viewing device in a single bit-stream.

Based on the expected viewer focal area, methods may include receiving, at the viewing device, fewer than all of the data segments that make up a complete video frame. Methods may include decoding fewer than all of the plurality of data segments. For example, data segments that are determined to be, or are expected to be, outside the viewer focal area may not be decoded.

Each data segment of a video frame may be stored in a discrete rendition. Each data segment of a video frame may be stored in two or more renditions. Two or more data segments may be stored in a single rendition.

Methods may include requesting a first number of data segments of a video frame from rasterized renditions of a first resolution. Methods may include requesting a second number of data segments of the video frame from rasterized renditions associated with a second resolution.

Methods may include dynamically recalculating an expected position of a viewer focal area during playback of the VR content. In response to recalculating the expected position, methods may include dynamically selecting one or more of the plurality of data segments for decoding.

A rendition may be one of a plurality of renditions that includes a data segment. Methods may include selecting one of the plurality of renditions based on one or more of: (1) a narrative path associated with the VR content, (2) bandwidth available on the network, (3) performance of the viewing device, (4) viewing behavior of the viewer and (5) a temperature of the viewing device.

Viewing behavior of the viewer may include a shifting frequency of a focal area. Viewing behavior of the viewer may include a narrative path through the VR content taken by the viewer.

Methods may include traversing a manifest file and determining possible paths to a video frame or other asset. Methods may include determining an earliest possible moment during playback of the VR content at which an asset may become active. Methods may include, based on the earliest possible moment, beginning to stream one or more data segments to the viewing device so that the data segments are available for decoding and/or playback, at the latest, at the earliest time.

Methods may stream a single bit-stream that contains data segments associated with a plurality of assets. An analysis of the earliest possible time (during playback of the VR content) at which an asset could be played back may be used to position the asset inside the bit-stream. For example, the asset may be positioned in the bit-stream such that at the earliest time the asset may be played back, it is already being streamed. The asset may be positioned in the bit-stream such that at the earliest time the asset may be played back, it is ready to be decoded.

In some bit-stream formats, there may not a convenient way to define a position of an asset within a bit-stream. Methods may include inserting transparency (for video) or silence (for audio) up to and after an asset in the bit-stream to appropriately position the asset.

A bit-stream may include two or more channels. In some embodiments, non-overlapping assets (e.g., assets not played back at the same time) may be collapsed into a single channel within a bit-stream. Collapsing assets (or data segments of such assets) into a single channel may reduce an amount of meta-data contained in the bit-stream. Collapsing assets (or data segments of such assets) into a single channel may reduce a processing overhead when decoding the assets (e.g., fewer decoders may be run on the viewing device).

Methods may include downloading or streaming multiple data segments associated with an asset in multiple bit-streams. Data segments may be temporarily stored on the viewing device (in memory, hard disk or in any suitable local persistent memory store) until the data segment is played back to a viewer. Data segments may be temporarily stored on the viewing device (in memory or on hard disk) until the data segment is no longer possibly going to be shown or played.

Methods may include synchronizing the received data segments based on a narrative playback timeline associated with the VR content. Methods may include designating a data segment as a "keyframe." A keyframe may include timing information that specifies when (e.g., in nanoseconds), in relation to total runtime of a piece of VR content, the data segment should be played back to a viewer. A manifest file may provide a way for assets to be designated as a keyframe. A manifest file may provide a way for assets to be assigned location inside of a channel/track of a bit-stream.

Methods may include selecting a data segment to stream. Methods may include prioritizing a streaming of a data segment. A data segment may be streamed based on a position of the viewer's focal area. A data segment positioned, or expected to be positioned, within the viewer's focal area may be selected for playback and designated as a high streaming priority.

Methods may include selecting data segments for streaming based on evaluating one or more selection factors. Methods may include selecting a rendition of a data segment for streaming based on evaluating one or more selection factors. Exemplary selection factors may include:

Viewing device frame rate—For example, video renditions streamed to the viewing device may not include more video frames than a device can play back. A switch to a rendition that includes less video frames (lower quality) may occur during playback of the VR content.

Supported video codecs (and decoding efficiency)—Some viewing devices may support a number of different codecs. For example, some viewing devices may efficiently decode H256 videos and may use those versions. However, some viewing devices may overheat when using H256, and preferably, should not receive data segments from renditions that require H256 decoding. A selected codec may be changed during playback should the viewing device be using a codec known to cause overheating. A selected codec may be changed during playback in response to detecting that device temperature is close to overheating.

Total supported video resolution—For example, some viewing devices may be unable to decode more than 2160 pixel rows, and greater sized (higher resolution) renditions may preferably not be selected.

Memory available—For some viewing devices, lower resolution renditions may be selected in order to avoid consuming more memory than allowed during playback of the VR content.

Network bandwidth—a goal is to display a high quality experience for the least bandwidth possible, and to degrade gracefully if the bandwidth cannot support the top quality offered.

Selection to playback latency—If there is a substantial latency between rendition/data segment selection and playback, then the viewing device may request a range of renditions that are less likely to need to vary often in order to maintain playback.

Device temperature—Due to the nature of VR video decoding, the viewing device is likely to get warm. However, after exceeding a threshold temperature, the operating system on the viewing device may begin to throttle back intensive tasks that contribute to the device's heat, or shift into a cool-down mode where decoding is put on hold while the device returns to a normal operating temperature. In order to avoid this, when using codecs or even levels of compression that are higher than other renditions available, methods may monitor for the device temperature to approach threshold temperatures and switch the rendition being used should the device get too close to overheating.

Viewer's focal area—Data segments not currently in view in a bandwidth restricted environment should be switched to lower renditions based on the data segment's streaming priority.

Viewer's current head movement and trajectory.

Analytics associated with the VR content (total group behavior, targeted group behavior, or other prior viewer behavior).

A narrative path associate with the VR content.

A selection factor may include a combination of selection factors. Generally, streaming methods may attempt to balancing playback of VR content at a highest possible quality while also ensuring that changes in network conditions, viewer focal area, and other performance factors are handled.

Methods may include weighting one or more selection factors. For example, analytic derived probabilities may be weighted based on previous correctness of the probabilities. As a further example, if a viewer is detected moving their head toward a data segment and, the viewer movement runs counter to an analytically predicted path the direction of the viewer may be assigned a higher weight in determining which data segment to stream.

Methods may include decoding data segments that correspond to less than an entire VR video frame. Methods may include decoding what is within a viewer focal area plus a safe area around the viewer focal area that may enter the viewer focal area faster than the viewing device can normally decode.

When streaming partial assets, data segments of an asset may be streamed at different qualities or not streamed at all based on a position of a viewer focal. However, some assets must be streamed even if they are outside the viewer focal area. For example, generally, audio assets must be streamed at least once. A viewer expects to hear sounds that emanate from behind the viewer's back—even though the video data segments behind the viewer's back may not have been streamed to the viewing device or decoded.

In some embodiments, audio assets may be included with every bit-stream. In such embodiments, audio decoding may switch between the bit-streams.

In some embodiments, audio assets may be streamed separately from video or visual assets.

Methods may include streaming data segments associated with video assets in multiple bit-streams. For example, a video asset may be divided into six data segments per eye. Such a sectioning may not require mapping the data segments onto any specific 3D shape.

Each data section may have any suitable size and/or shape. Data segments may be identical for each eye view or may be different for each eye view. Data segments may be encoded or packaged into one bit-stream or may be packaged into two or more bit-streams.

Methods for playback of VR content are provided. The method may include streaming or downloading data segments associated with VR content to a viewing device. The data segments may be connected with a decoding module running on the viewing device. Data segments marked as needed may be decoded and output from the viewing device (visual or sound). Data segments may be marked as needed based on a position of a viewer's focal area. Data segments may be marked as needed based on amount of elapsed time from a start of playback of the VR content. A data segment may be associated with meta-data indicating when, during the playback the data segment should be output by the viewing device.

For video data segments, after decoding, the data segment may be mapped to a predefined "surface." For example, the surface may a spherical surface. The surface may be mapped onto a 3D shape and positioned alongside one or more other data segments.

The viewing device may extract pixels from the decoded video data segment. The extracted pixels may represent less than the entire data segment. The viewing device may map the extracted pixels to a section of the 3D shape which is aligned with a focal area of the viewer.

In some embodiments, same section of the 3D shape may be used for both right and left eye focal areas. In some embodiments, different data segments may be associated with each eye focal area (e.g., 3D video).

Information about the position of the viewer's focal area may be used to both generate VR content output and to determine which data segments to decode next.

Methods may include a latency test. The latency test may calculate an amount of time to locate and decode a new section of video that is not currently decoding. The latency test may determine when to request and decode new data segments to for continuous streaming playback of the VR content.

Apparatus may include a system for reducing computational overhead associated with streaming playback of virtual reality ("VR") content. The system may include a viewing device. The viewing device may include a graphical processing unit ("GPU"), a central processing unit ("CPU"), a transitory memory, a non-transitory memory, and a transceiver. The transceiver may be configured to transmit and receive information over a network.

The system may include a software application. The software application may be stored in the non-transitory memory and may be executable by the CPU and/or GPU. The software application may control the streaming playback of the VR content.

The software application may calculate an expected position of a viewer focal area. The expected position may be calculated with respect to an asset of the VR content. The asset may be a video frame. The asset may be audio. The expected position may be calculated relative to the asset as the viewer may perceive experiencing the asset during playback. For example, the viewer may perceive to be enveloped by a video asset.

Assets may be sectioned into data segments. For example, a video asset may be sectioned into 1, 2, 3, 4, 5, 6 or more data segments. An asset sectioned into 6 data segments may be conceived as a cube. An asset sectioned into 6 data segments may be conceived as any suitable 3D shape.

A data segment may be any suitable size, include any suitable amount of data or include any suitable proportion of an asset. A size of a data segment may depend on a codec used for the asset.

The software application may, request, based on the expected position of the viewer focal area, a set of data segments. The requested set of data segments may be less than all of the asset. The software application may receive the set of data segments over a network. The software application may instruct the CPU and/or GPU to decode the set of data segments. The software application may store the decoded set of data segments in the transitory memory before the asset is scheduled to be played back to the viewer. When the asset is scheduled to be played back to the viewer and in response to detecting that the viewer focal area includes the expected position, playing back, on the viewing device, the decoded set of data segments stored in the transitory memory.

Playback of the decoded set of data segments may include drawing a first set of pixels on a screen of the viewing device corresponding to a right eye view. Playback of the decoded set of data segments may include drawing a second set of pixels on the screen corresponding to a left eye view.

The set of data segments may be a first set. The software application may control the streaming playback of the VR content by requesting, based on the expected position of the viewer focal area, a second set of data segments. The second set of data segments may be less than all of the asset. The second set of data segments may correspond to an area outside the expected viewer focal area. The second set of data segments may not be decoded before the asset is scheduled for playback on the viewing device.

The software application may control the streaming playback of the VR content by requesting the first set of data segments from a first plurality of renditions associated with the asset. Each member of the first plurality may have a resolution above a threshold resolution. The software application may also request a second set of data segments from a second plurality of renditions associated with the asset. Each member of the second plurality may have a resolution below the threshold resolution.

Each data segment of an asset may be streamed from a discrete rendition. A rendition corresponding to a data segment may be switched to different quality rendition during playback of the VR content that includes the asset.

Different quality renditions may be selected in response to whether an asset is being streamed or downloaded. Different quality renditions may be selected based on one or more performance characteristics of a viewing device.

For example, for some viewing devices, renditions utilized for streaming assets may include a maximum resolution of 3840×2160 pixels. Renditions of a lower quality level may decrease in resolution (and as a result, a decrease in bitrate too). Renditions of a lower quality level may decrease only in bitrate. As a further example, for some viewing devices, a lowest quality level rendition may have a resolution of at least 2048×2048 pixels. A manifest file may provide information about the one or more renditions associated with an asset.

A data segment may exist in a plurality of renditions. Each of the plurality of renditions may have a different tier of quality or quality level. Methods may include switching between renditions of the different quality levels. For example, if a viewing device playing back streaming VR content registers that bandwidth on the network is being restricted, the viewing device may be programmed to begin buffering data segments from a rendition that has a lower bit-rate or a lower resolution to continue playback uninterrupted.

A set of data segments may be one of a plurality of sets. The software application may control the streaming playback of the VR content such that, before activating the asset, the plurality of sets are stored in the transitory memory. The plurality of sets may correspond to all of the asset.

The asset may be an audio asset. An audio asset may be an audio asset is played back without any spatial filtering. It has properties for active, play, and volume.

An audio asset may be a grouping of multiple tracks of audio within a coordinate system such that a location of the audio determines how much of that audio asset is played back into to a specific ear of a viewer. Methods may support panning of audio assets placed within a spherical-hull.

An audio asset may include assets processed to sound as if they were coming from a particular point in space. Producers may position the audio asset in a particular context such as a room that echoes heavily.

Audio assets may be assets in Ambisonics B-Format (1st Order Ambisonics). Ambisonics B-Format includes as a part of its native format spatial playback information. This may be used in conjunction with the viewer focal area information to playback the audio asset based on the given spatial information.

An audio asset may not have a clearly defined physical shape. As a result, assets, which may or may not be visible, may hold the focal area trigger and allow a position of a viewer focal area to be associated with the audio asset.

For example, an audio asset may be designed to be played as if it were emanating 1 meter behind and to the right of the viewer's head when the viewer's focal area includes a point one meter in front of and to the left of the viewer's head. Methods may include creating a 'mesh' instance which would, be dealt with only mathematically to calculate focus area-collision, without rendering any visible object. This mesh object would be set up at the location approximately 1 meter in front of and to the left of the viewer. The mesh object may be triggered by the viewer focal area. Triggering the mesh object may activate the audio asset to play at an initial time associated with the asset, from a location of 1 meter behind and to the right of the user.

The software application may traverse, within a manifest file associated with the VR content, all possible paths to an asset. Based on the manifest file, the software application may determine an earliest possible time at which the playback of the asset occurs during playback of the VR content. Before the earliest possible time, the software application may request the set of data segments from a remote storage location.

Based on the manifest file, the software application may detect a cluster of a threshold number of assets within the VR content that are each associated with playback at substantially the same time.

The threshold number of assets may cause an increase in the byte-density-per-second being streamed. The increase in byte-density may "choke" the viewer's network connection by consuming much of the viewer's available bandwidth and result in a "choppy" viewing experience. Clustering may be identified based on analysis of the manifest file. In response to detecting the cluster, the software application may sequentially request a set of data segments for each asset in the cluster.

The software application may receive each member of the set of data segment at a different time and synchronize the playback of each member of the set of data segments.

A computational overhead imposed on the CPU and/or GPU to render a first number of pixels based on the decoded set of data segments may be less than a computational overhead that would have been imposed on the CPU and/or GPU to render a second number of pixels by decoding all of the asset. The first number of pixel may be greater than the second number of pixels. Thus, higher quality video may be decoded with less computational overhead.

For example, some viewing devices may include a decoding cap of 2160 rows of pixels. Methods described herein may decode up to 2160 rows of pixels within the viewer focal area. Other data segments of the video frame outside the viewer focal area may not be decoded.

Only part (e.g., specific data segments) of a video frame or asset may be decoded. As a result, less video may be decoded at a higher quality saving GPU, CPU, and memory resources as a result of not decoding the entire video frame. Reduction of GPU and CPU usage may result in lower battery use and a lower risk of the viewing device overheating.

For example, if a video frame includes six data segments, streaming five data segments using full quality renditions (instead of all six data segments) may yield a 16.66% reduction in bandwidth use and in amount of data decoded by a viewing device. On average, it is expected to achieve at least between a 33.33% (⅔) and 83.33% (⅚) reduction in bandwidth use. On viewing devices that may only decode a maximum of 4 data segments simultaneously, it is expected to achieve at least between 50% and 66.66% reduction in bandwidth use in amount of data decoded by a viewing device. Reducing an amount of data decoded by the viewing device may be realized in reduced of GPU and CPU usage. Reduced CPU/GPU usage may result in a lower energy draw, lower battery use and lower device temperature.

Projected estimates of bandwidth and computational savings may change based on how many data sections are included in a VR asset. Projected estimates of bandwidth and computational savings may improve based on rendition selection for each data segment.

A system for regulating temperature of a viewing device during playback of virtual reality ("VR") content is provided. The system may include a software application stored in a non-transitory memory of the viewing device. The software application may be executable by a CPU and/or GPU of the viewing device. The software application may control playback of the VR content.

The software application may, for a first video frame of the VR content, buffering a first data segment. The first data segment may be less than all of the first video frame. The first data segment may be associated with a first quality level. In response to a first shift in a viewer focal area, the software application may render pixels on a screen of the viewing device based on the first data segment.

For a second frame of the VR content, the software application may buffer a second data segment. The second data segment may be less than all of the second frame and may be associated with a second quality level. In response to a second shift in the viewer focal area, the software application may render pixels on the screen of the device based on the second data segment.

The software application may further control the playback of the VR content by monitoring a temperature of the viewing device and selecting a quality level for the second data segment. A plurality of second data segments may be available for selection, each member of the plurality having a different quality level.

The software application may control playback of the VR content by monitoring the temperature of the viewing device and in response to detecting that the temperature is within a threshold temperature, selecting the second quality level such that decoding of the second data segment does not raise the temperature above the threshold temperature.

The software application controls the playback of the VR content calculating an expected position of a focal area of the viewer with respect to the second frame of the VR data. Based on the expected position of the focal area, selecting the second data segment from among a plurality of data segments. The plurality of data segments may collectively comprise all of the second frame of the VR data.

One of ordinary skill in the art will appreciate that embodiments described herein may be embodied in whole or in part as a method, a data processing system, or a computer program product. Embodiments disclosed herein may be partially or wholly implemented on a computer readable medium, for example, by storing computer-executable instructions or modules or by utilizing computer-readable data structures. Accordingly, the invention may take the form of an entirely hardware embodiment, an entirely software embodiment or an embodiment combining software, hardware and any other suitable approach or apparatus. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, solid state storage devices, flash drives and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Apparatus and methods will now be described in connection with the FIGS. The FIGS. show illustrative features of apparatus and methods. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus may involve one, two or more, or all of the features of the illustrative apparatus and/or one, two or more, or all of the steps of the illustrative methods. Apparatus may include combinations of one, two or more, or all of the features of the illustrative apparatus and/or combinations of one, two or more, or all of the steps of the illustrative methods.

Methods may involve one, two or more, or all of the features of the illustrative apparatus and/or one, two or more, or all of the steps of the illustrative methods. Methods may involve combinations of one, two or more, or all of the features of the illustrative apparatus and/or combinations of one, two or more, or all of the steps of the illustrative methods.

The methods of the above-referenced embodiments may involve the use of any combination of methods or one or more steps of methods. Methods may include use of any computer-executable instructions, or computer-readable data structures disclosed herein. The steps of the methods may be performed in an order other than the order shown and described herein. Some embodiments may omit steps shown and described in connection with the illustrative methods. Some embodiments may include steps shown and described in connection with other illustrative embodiments. Some embodiments may include steps that are not shown and described in connection with the illustrative methods.

Illustrative embodiments will now be described with reference to the accompanying drawings, which form a part hereof.

FIG. 1 is a block diagram that illustrates a computing device 101 (alternatively referred to herein as a "viewing device," "server" or "computer") that may be used according to an illustrative embodiment of the invention. The computer 101 may have a processor 103 for controlling overall operation of the server and its associated components, including RAM 105, ROM 107, input/output ("I/O") module 109, and memory 115.

I/O module 109 may include a microphone, camera, keypad, touch screen, touch pad, motion detection controllers, devices for capturing user motions and/or stylus through which a user of device 101 may provide input, and may also include one or more of a speaker for providing audio output and a video display device for providing textual, audiovisual and/or graphical output. I/O module 109 may include hardware for displaying VR content such as a screen.

Software may be stored within memory 115 and/or other storage (not shown) to provide instructions to processor 103 for enabling computer 101 to perform various functions. For example, memory 115 may store software used by computer 101, such as an operating system 117, application programs 119, and an associated database 111. Alternatively, some or all of computer executable instructions of computer 101 may be embodied in hardware or firmware (not shown).

Computer 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks such as cellular, Wi-Fi, Bluetooth or other wired and wireless networks. When used in a LAN networking environment, computer 101 is connected to LAN 125 through a network interface or adapter 113. Network interface or adapter 113 may include an antenna or other transceiver for transmitting/receiving data over a wireless connection. When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, UDP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by computer 101, may include computer executable instructions for invoking user functionality related to communication, such as email, short message service (SMS), and voice input and speech recognition applications.

Computer 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms or "mobile apps" that may be used to adaptively stream VR content, process VR content, display VR content, register metadata, transmit/receive metadata and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
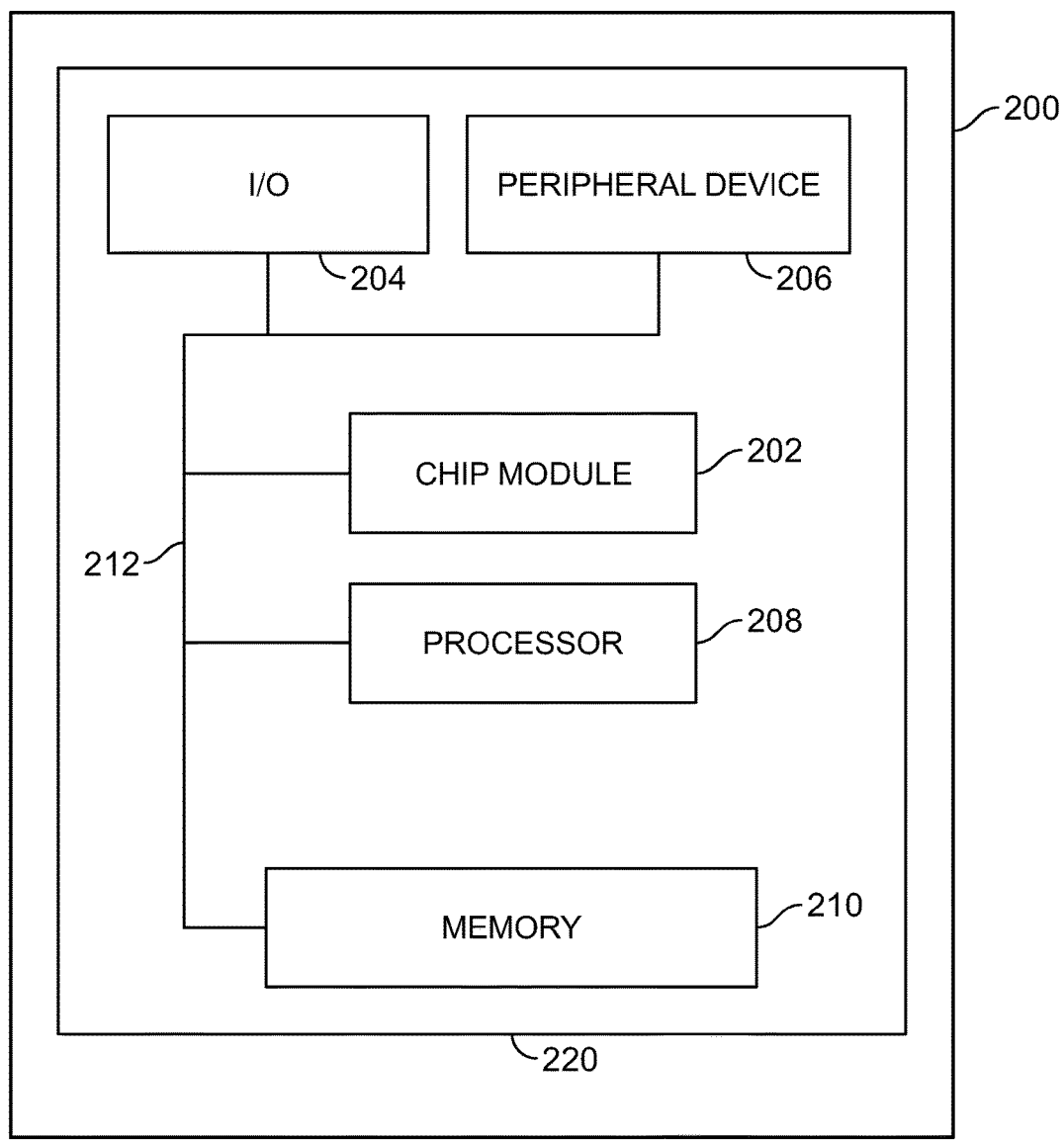
FIG. 2 shows illustrative apparatus in accordance with principles of the invention.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, quantify indices; and machine-readable memory 210.

Machine-readable memory 210 may be configured to store in machine-readable data structures: historical sequential data and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
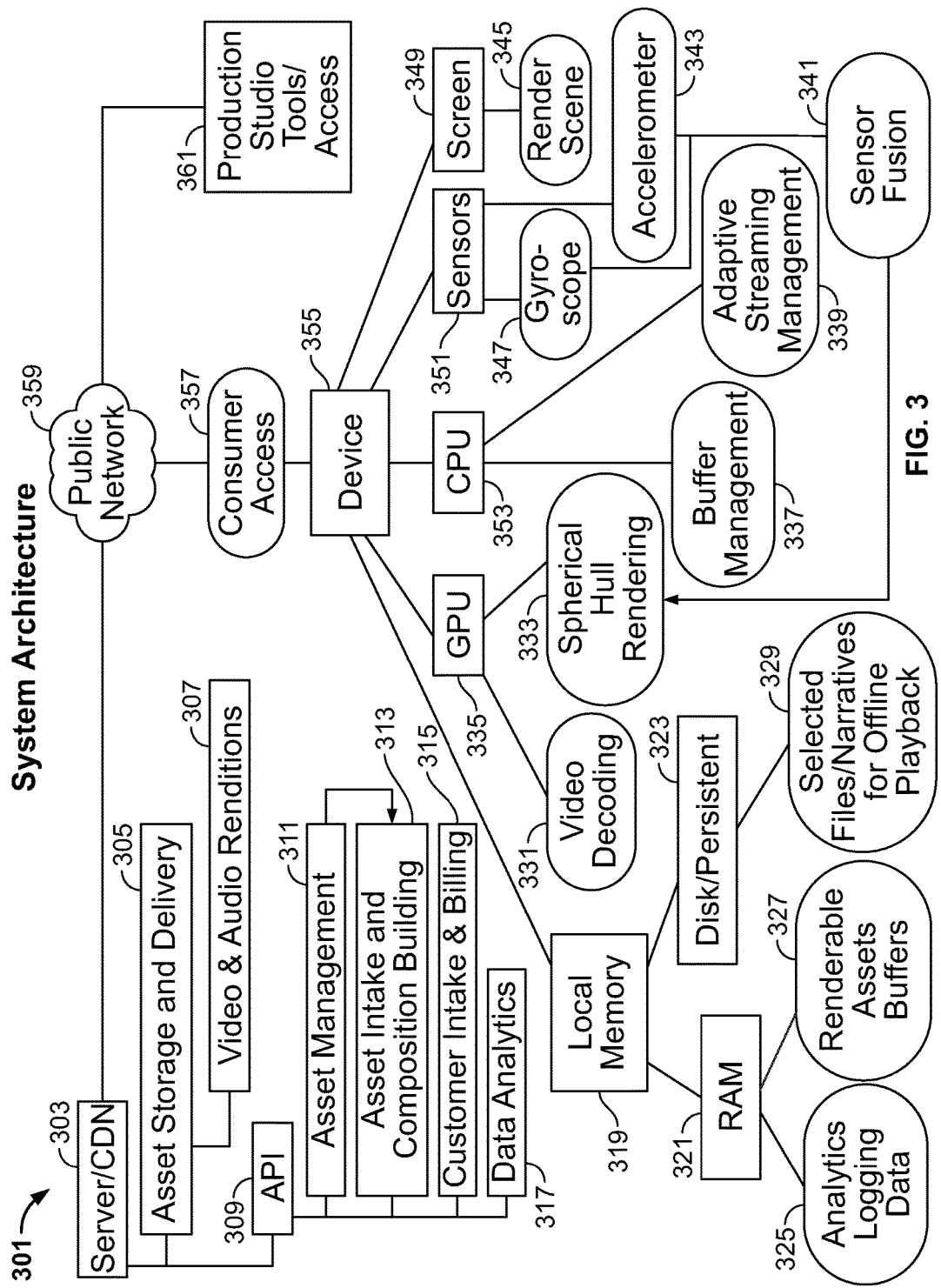
FIG. 3 shows illustrative apparatus in accordance with principles of the invention.

FIG. 3 shows illustrative system architecture 301. Architecture 301 shows illustrative components that that may be utilized to stream VR content to viewing device 355. Viewing device 355 may access public network 359 via customer access portal 357. Public network 359 may include the internet. Customer access portal 357 may be provided by a cellular provider, internet service provider or other suitable network service provider.

Viewing device 355 may include one or more features of computer 101 (shown in FIG. 1) and/or apparatus 200 (shown in FIG. 2). Viewing device 355 may include graphics processing unit ("GPU") 335, central processing unit ("CPU") 353, sensors 351 and screen 349. Screen 349 may be a touch screen that is configured to accept input from a user of viewing device 357. Screen 349 may be part of a mobile device. For example, the Samsung Gear VR utilizes a Samsung Galaxy Note 4 device to provide the GPU, CPU and screen. Google "Cardboard" devices rely on a viewer's mobile device to provide the GPU, CPU and screen.

Screen 349 may be configured to display VR content to the viewer. For example, screen 349 may be configured to display stereoscopic images/video or projections of 3D images/video. VR content may be rendered by viewing device 355 and displayed on screen 349 as rendered content 345.

Sensors 351 include gyroscope 347 and accelerometer 343. Sensors 351 may include a camera, magnetometer, microphone, biometric sensors or any other suitable sensing devices. Sensors 351 may be used to determine a viewer focal point. The viewer focal point may be determined with respect to movement of viewing device 355. Sensors 351 may be used to determine the viewer focal point based on detecting movement of the viewer or viewing device 355.

CPU 353 may provide computational processing for buffer management 337. For example, CPU 353 may store data segments of VR content into specific buffer locations. Buffers may include memory 115, RAM 103, ROM 107 or any other suitable components of computer 101 (shown in FIG. 1).

CPU 353 may provide computational processing for adaptive streaming management 339. For example, CPU may issue requests for VR content in response to information captured by sensors 351. CPU 353 may issue requests for VR content based on bandwidth available through customer access portal 357 or across public network 359.

GPU 335 may provide computational processing for video decoding 331 of VR content received by device 355. GPU 335 may render the received VR content. For example, GPU 335 may map or position VR content onto a spherical-hull projection 333. A spherical-hull projection may allow 2D data to be displayed on a 2D screen so that the VR content appears, to the viewer, to be wrapped around, or mapped onto, a spherical-hull. VR content mapped onto the spherical-hull provides an "immersive" experience" to the viewer.

Screen 349 may be a 2D screen. The immersive experience may include a viewer of the VR content displayed on screen 349 perceiving VR content responsive to viewer motion in any one of up to six directions and/or six degrees of freedom. A viewer focal point may be detected by sensors 351. In response to viewer motion, the viewer may perceive VR content that has been mapped to an area on a surface of the rendered spherical-hull projection 333 responsive to the motion and corresponding to the viewer's focal point.

Data captured by sensors 351 may be "fused" at 341 and utilized to determine a position of a viewer focal point. The captured sensor data may be used to determine VR content mapped onto of a spherical-hull and presented on screen 349 as spherical-hull projection 333. Apparatus and methods for adaptive streaming of VR content may allow device 355 to display VR content in response to shifts in viewer focus with low or near zero latency.

Device 355 may include local memory 319. Local memory may include RAM 321 and disk or persistent storage 323. Persistent storage 323 may store VR content that has been received by device 355. VR content 329 stored on persistent storage 323 may be available for display or playback even if device 355 is not connected to consumer access portal 357 or public network 359. Local memory 319 may include buffers for queuing VR received by viewing device 355.

RAM 321 may provide transient storage for VR content that has been received by viewing device 355. RAM 321 may provide transient storage for metadata or analysis 325 of VR content processed by device 355. RAM may also provide transient storage for rendered VR assets for playback via device 355. RAM may also provide transient storage for renderable VR assets 327 received by device 355.

Server or content delivery network ("CDN") 303 may store VR content. CDN 303 may be accessible to device 355 via public network 359. CDN 303 may be one of a plurality of CDNs. Each of the plurality of CDNs may be positioned in different geographic locations. CDN 303 may include hardware (see, e.g., FIGS. 1 and 2) for storing and delivering VR content. The VR content stored on CDN 303 may include any suitable VR assets. Assets 305 may be included in video and audio renditions 307 of VR content.

CDN 303 may be accessible via an application program interface ("API"). For example, device 355 may communicate with CDN 303 using API 309. Device 355 may utilize API to request VR content stored on CDN 303.

API 309 may provide access to software and hardware tools 311 for management of VR assets. Tools 311 may manage VR assets in response to streaming requests received from device 355. For example, tools 311 may API 309 may provide access to tools 313 for storing and preparing VR content for streaming.

API 309 may provide access to tools 313 for asset intake and composition building. VR composers may utilize API 309 to access tools for creating narrative paths linking narrative nodes. VR composers may user API to upload new VR content to CDN 303.

Architecture 301 may include production studio and access tools 361. Access tools 361 may provide apparatus and methods for creating VR content.

Figure 4:
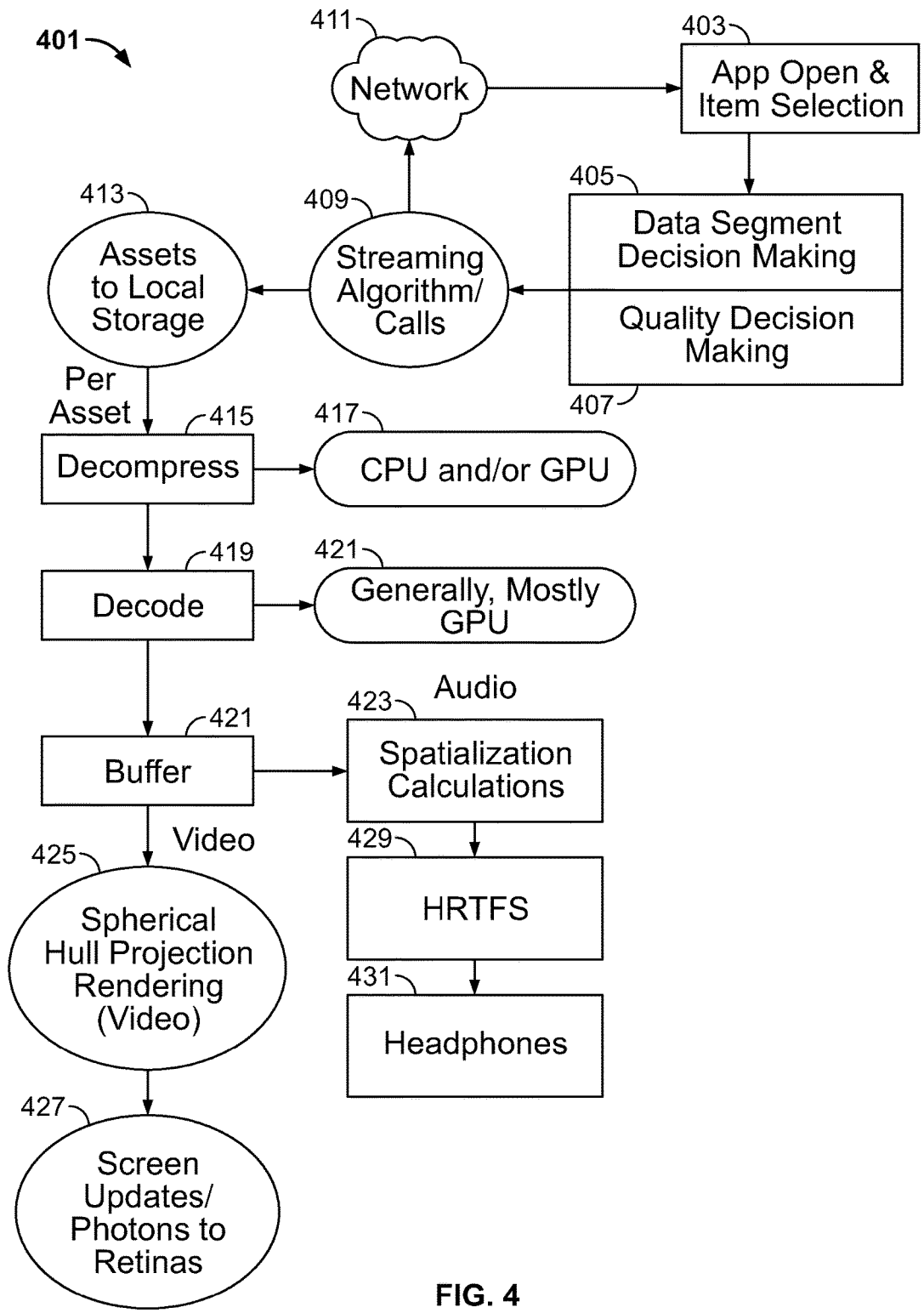
FIG. 4 shows an illustrative process in accordance with principles of the invention.

FIG. 4 shows illustrative process flow 401. Process flow 401 may illustrate a process for adaptive streaming of VR content. For the sake of illustration, one or more of the steps of the process illustrated in FIG. 4 will be described as being performed by a "system." The "system" may include one or more of the features of the apparatus or architecture or processes shown in FIGS. 1-3 and/or any other suitable device or approach. The "system" may be provided by an entity. The entity may be an individual, an organization or any other suitable entity.

Process 401 may begin at step 403. At step 403, a viewer may open an app on a mobile device. Using a graphical user interface presented by the app, the viewer may navigate to VR content available to be streamed to the viewer. The viewer may select desired VR content.

At steps 405 and 407, a request for VR content selected by the viewer may be received at a CDN (shown in FIG. 3) or other remote location.

At steps 405 and 407, the system may identify a rendition of the VR content to be streamed to the viewer. The rendition may be identified from among a plurality of available renditions. Each available rendition may have different data segment sizes and/or different resolutions. In some embodiments, a rendition may be associated with a specific data segment size.

A preferred rendition may be identified based on bandwidth over a connection linking the viewing device and the CDN. A preferred rendition may be identified based on one or more performance characteristics of the viewing device. A preferred rendition may be identified based on one or more properties of the desired VR content. Properties of the VR content may be set by a composer/producer of the VR content. Properties of the VR content may include a number of narrative nodes, a number of narratives paths, and a number of VR assets associated with the content or any suitable properties.

At steps 405 and 407, the system may decide which data segments to be streamed to the viewer. The system may decide which data segments to stream based on bandwidth, viewer orientation, viewer focal point, viewing device performance, desired VR content or any other suitable factors. In some embodiments, the system may determine a size of the data segments to stream. The system may decide a size of the data segments to stream based on bandwidth, viewer orientation, viewer focal point, viewing device performance, desired VR content or any other suitable factors.

At step 409, streaming calls or requests may be transmitted/received by the system. The streaming calls may request delivery of VR content to the viewing device. The streaming calls may correspond to a request for a rendition having different data segment size or resolution. A streaming call may indicate a switch between narrative nodes.

At step 413, requested desired VR content may be received and stored. For example, requested VR content may be stored locally on the viewing device. The received VR content may include one or more VR assets. At step 415, received VR content may be decompressed. VR content may be transmitted to a viewing device in compressed form. Transmitting VR content in compressed may reduce bandwidth needed to stream the VR content. Step 417 shows that decompression may be performed locally on the viewing device by the device's CPU and/GPU.

At step 419, the received VR content is decoded. Step 421 shows that the decoding may be generally performed by a GPU. At step 421, the received content is buffered on the viewing device.

For video assets, at step 425, spherical projection rendering is performed. The rendering prepares the VR content for display on a planar screen. The rendering may allow the viewer to perceive an "immersive experience" when viewing the VR content. An immersive experience may include VR content that appears to envelope the viewer. The viewer may view different aspects of the VR content when looking right, left, forward, backward, up or down. At step 427, the video assets are presented on a screen of the viewing device.

For audio assets, at step 423, spatial calculations are performed. The spatial calculation may include determining an environment that, as depicted by VR video assets, currently envelope the viewer. At step 429, the system may apply a head related transform function ("HRTFS") to the audio asset. Applying the HRTFS may include simulating an effect of the audio asset in response to a position of the viewer with respect to environmental conditions depicted in the video assets. Applying the HRTFS may include simulating an effect of the depicted environmental conditions on the audio asset. For example, an audio asset may be manipulated to sound differently if the viewer perceives that he is inside a building or outside the building while experiencing VR content. An audio asset may be manipulated to sound different depending where in the building the viewer perceives to be positioned.

At step 431, after applying the HRTFS to the audio asset, the audio may be delivered to the viewer via headphones or any other suitable output hardware.

Figure 5:
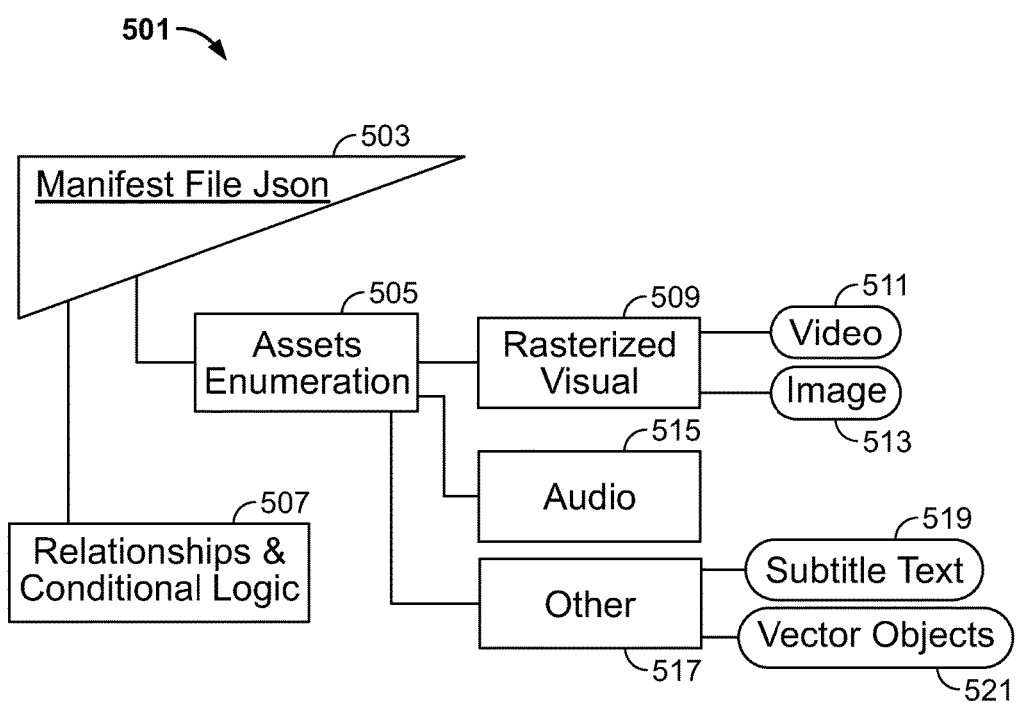
FIG. 5 shows illustrative relationships in accordance with principles of the invention.

FIG. 5 shows illustrative narrative architecture 501. Narrative architecture shows exemplary components of VR assets that may be stored in a CDN. Architecture 501 includes manifest file 503. A manifest file may be in JSON (JavaScript Object Notation) format. Manifest file 503 may be associated with enumerated VR assets 505. Enumerated VR assets 505 may include rasterized visual data 509, audio data 515 and other suitable data 517. Rasterized visual data 509 may include video files 511 and image files 513. Rasterized visual data 509 may include a 2D object and coordinates for positioning the planar object into a 3D space.

Other suitable data 517 may include subtitle text 519 and vector objects 512. Other suitable data 517 may include touch data or smell data (not shown).

Manifest file 503 may include relationships and conditional logic 507. Relationships and conditional logic 507 may provide a "roadmap" associated with VR content to adaptive streaming apparatus and methods. The roadmap may include one or more narrative paths linking narrative nodes and assets associated with narrative nodes.

Figure 6:
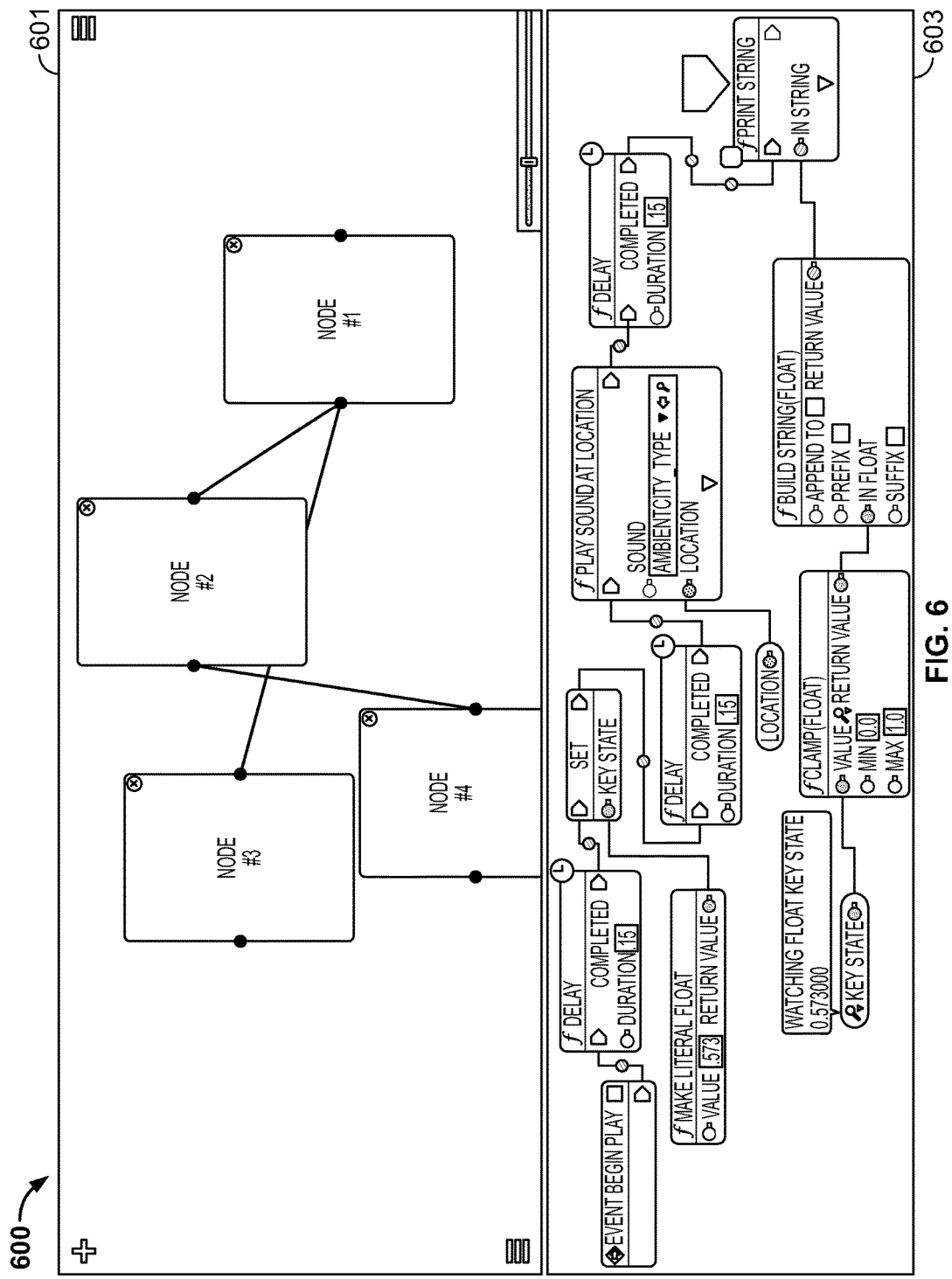
FIG. 6 shows illustrative relationships in accordance with principles of the invention.

FIG. 6 shows illustrative components 600 of a multi-path narrative composer. VR content may be multilinear in that the VR content may include a narrative that does not have a single repeatable experience for a viewer. VR content may allow the viewer to control the story. For example, if, for instance, the viewer had been looking around (any one of six degrees of freedom) and saw a plot point or other marker in a narrative, the narrative can go down a drastically different narrative path from another viewer that missed the plot point.

A multi-path composer may provide VR producers with tools for creating smooth media transitions based on choices the viewer makes (possibly by looking at or near a particular data segment or VR asset). Apparatus and methods for adaptive streaming may stream VR content (and associated media transitions) in response to viewer decisioning. Viewer decisioning may be determined based on viewer focus and time that elapses between focal point shifts. Viewer decisioning may be determined based on viewer body movement and/or voice commands.

A multi-path composer may include tools for linking narrative nodes. For example, component 601 shows an exemplary embodiment of a tool for creating links among narrative nodes 1-4.

A multi-path composer may include tools for editing assets associated with one or more narrative node. For example, component 603 shows an exemplar embodiment for editing VR assets. Editing the VR assets may include assigning a temporal position of the asset within the VR content, or assigning a viewer action that may trigger playback of the VR asset.

Figure 7:
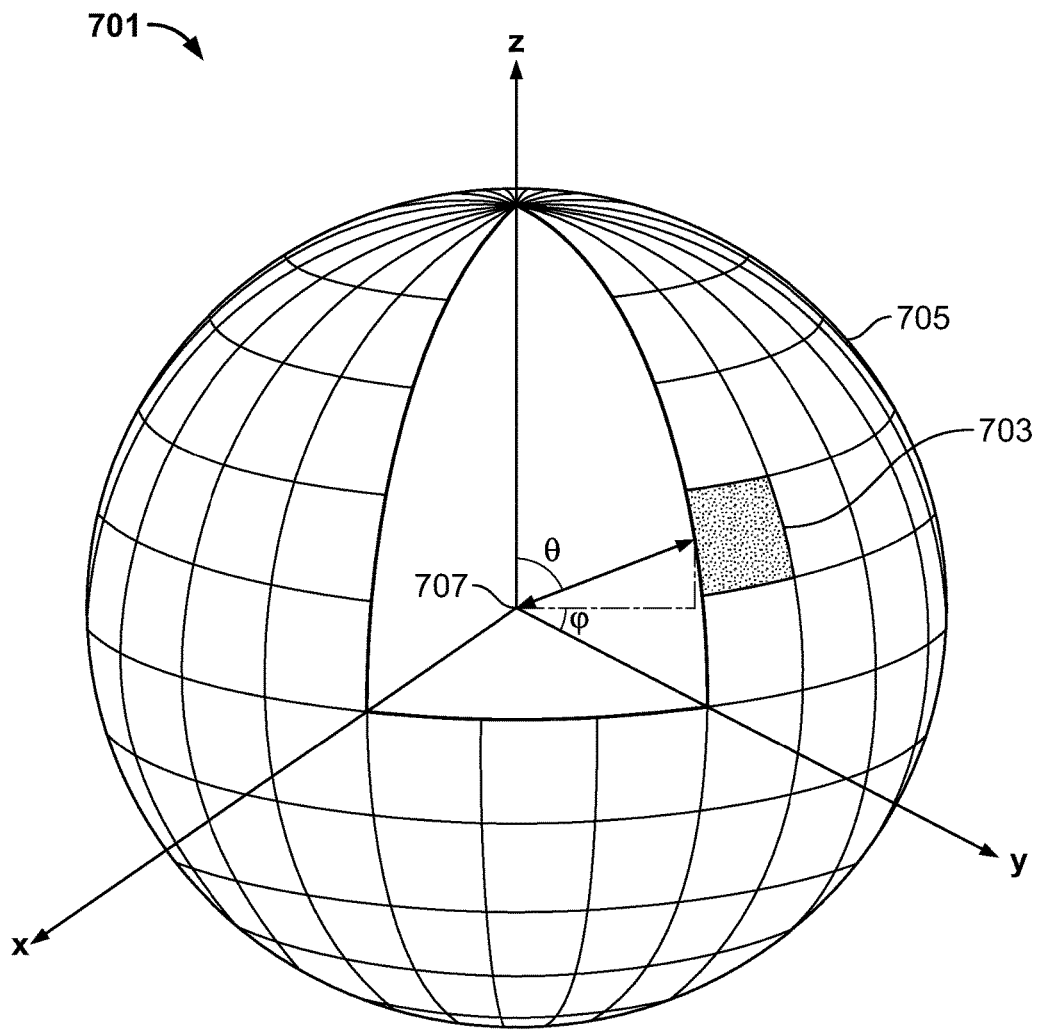
FIG. 7 shows illustrative information in accordance with principles of the invention.

FIG. 7 shows illustrative frame-of-reference 701. Frame-of-reference 701 may be used to provide an illustrative framework for detecting a viewer focal point for determining VR content that is displayed to the viewer. Frame-of-reference 701 includes spherical-hull 705. To provide a viewer with an immersive experience, VR content may appear, to a viewer, to be mapped onto spherical-hull 705. From a perspective of a viewer, VR content may be displayed across an inside surface area of spherical-hull 705. A viewer positioned at origin 707 of spherical-hull 705 may be immersed in the VR content displayed along the inside surface of spherical-hull 705.

For example, viewer body movement may be used to determined where, on the surface of spherical-hull 705, the viewer is focused. VR content associated with a surface on the surface of a spherical-hull that is within a field-of-view of the viewer may be displayed to the viewer on a viewing device.

Various techniques may be utilized to present VR content to a viewer using a 2D screen. For example, mathematical projections, such as equirectangular (or cylindrical equidistant) spherical projections, may be utilized to generate an appearance of 3D shapes and spaces. Other illustrative projections that may be utilized include cubic or cylindrical projections.

VR content may be streamed to a viewing device in increments of data segments. Each data segment may represent VR content mapped onto a location on the inside surface of spherical-hull 705. VR content may be mapped onto other 3D shapes. For example, VR content may be mapped onto cubic or cylindrical shapes. VR content may be perceived to surround a viewer positioned within a cubic shape or within a cylindrical shape.

Apparatus and methods may utilize a cubic or cylindrical frame-of-reference. For example, a viewer focal point may be identified using polar coordinates $(\rho, \varphi, z)$. Each point P on a surface of a cylinder may be defined by $(\rho, \varphi, z)$, where $\rho$ is the distance from a Z axis (cylindrical or longitudinal axis), $\varphi$ is the azimuth angle between an X, Y axis and a projection of P on the X, Y plane. The height z is a distance from the X, Y plane to the point P.

Frame-of-reference 701 shows illustrative spherical surface area 703. Data segments may be of any suitable size, relative to the inside surface of spherical-hull 705. For example, a data segment may include ½, ¼ or 1/17 of the inside surface. Data segments may be defined in terms of amount of information included in each data segment. For example, data segments may be 50 kb, 1 MB or any suitable size. A size of a data segment may be selected based on bandwidth or other streaming considerations.

A viewer may perceive to view VR content from origin 707. Viewer body movements may be correlated to a shifting of the viewer's focal point along a surface of spherical-hull 705. The shifting may occur by replacing VR content displayed to the viewer with VR content mapped to another location on spherical-hull 705.

Frame-of-reference 701 shows a viewer focused on VR content mapped to spherical surface area 703. The viewer focal point may be defined in terms of spherical coordinates $(r, \theta, \varphi)$. A viewer focal point may include an area surrounding the intersection of r and spherical-hull 705.

When a viewer is focused on an area of spherical-hull 705 defined by $(r, \theta, \varphi)$, apparatus and methods for adaptive streaming of VR content may process VR content corresponding to an area defined by $(r, \theta_A, \varphi_A)$. The area defined by $(r, \theta_A, \varphi_A)$ may be positioned outside the area of the viewer focal point.

For example, if $(r, \theta_A, \varphi_A)$ is greater than a predetermined distance from $(r, \theta, \varphi)$, the VR content corresponding to $(r, \theta_A, \varphi_A)$ may not be streamed to the viewing device. If $(r, \theta_A, \varphi_A)$ is less than a predetermined distance from $(r, \theta, \varphi)$, the VR content corresponding to $(r, \theta_A, \varphi_A)$ may be streamed to the viewing device at a lower resolution than the VR content corresponding to $(r, \theta, \varphi)$. If $(r, \theta_A, \varphi_A)$ is less than a predetermined distance from $(r, \theta, \varphi)$, the VR content corresponding to $(r, \theta_A, \varphi_A)$ may be streamed to the viewing device at a higher resolution than the VR content corresponding to $(r, \theta, \varphi)$. Apparatus and methods for adaptive streaming may adjust $\theta_A$ or $\varphi_A$ based on metadata associated with previous views of the VR content. In some embodiments, $\theta_A$ or $\varphi_A$ may vary for different narrative nodes or for different VR assets associated with a narrative node.

Figure 8:
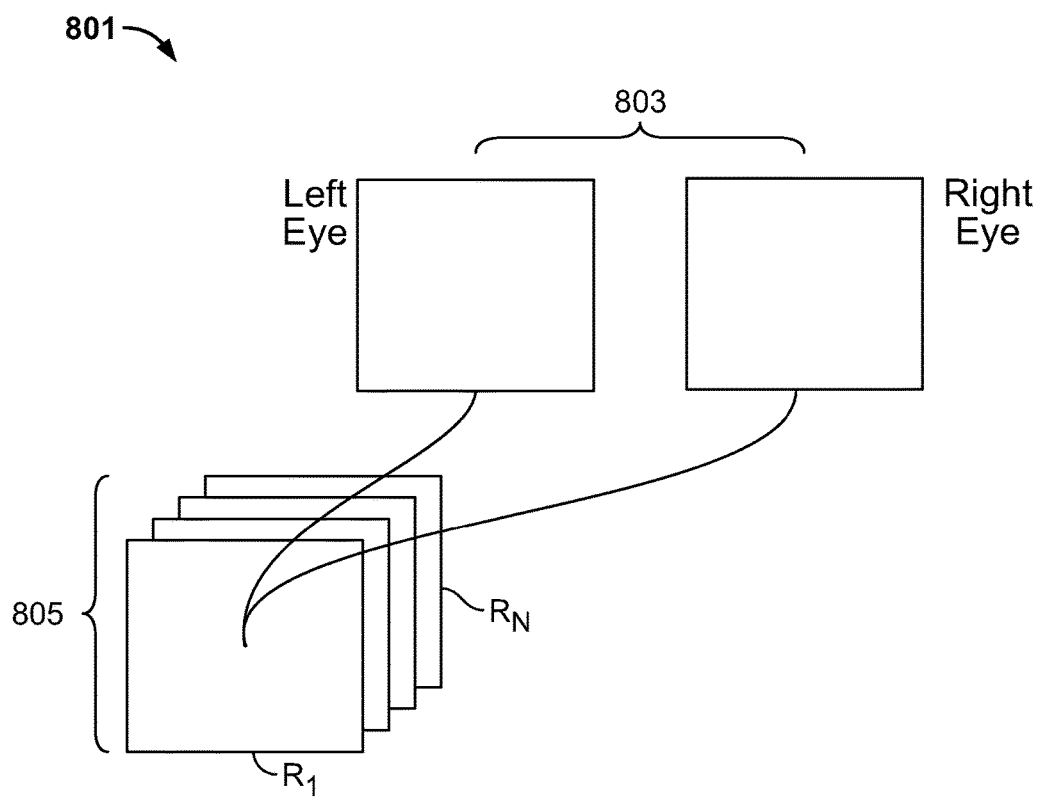
FIG. 8 shows illustrative apparatus in accordance with principles of the invention.

FIG. 8 shows illustrative architecture 801. Architecture 801 may include stereoscopic data 803. To provide a 3D experience, apparatus and methods may be configured to present VR content to a viewer as stereoscopic data 803.

Stereoscopic data 803 may be configured to mimic different viewpoints observed by a viewer's right and left eyes to provide depth perception.

Apparatus and methods may include extracting VR content for stereoscopic data 803 from one or more rendition files 805. Rendition files 805 may include files $R_1 \ldots R_N$. Each of the rendition files may be stored on one or CDNs. Apparatus and methods may include extracting VR content different renditions files for the right eye image and for the left eye image.

Figure 9:
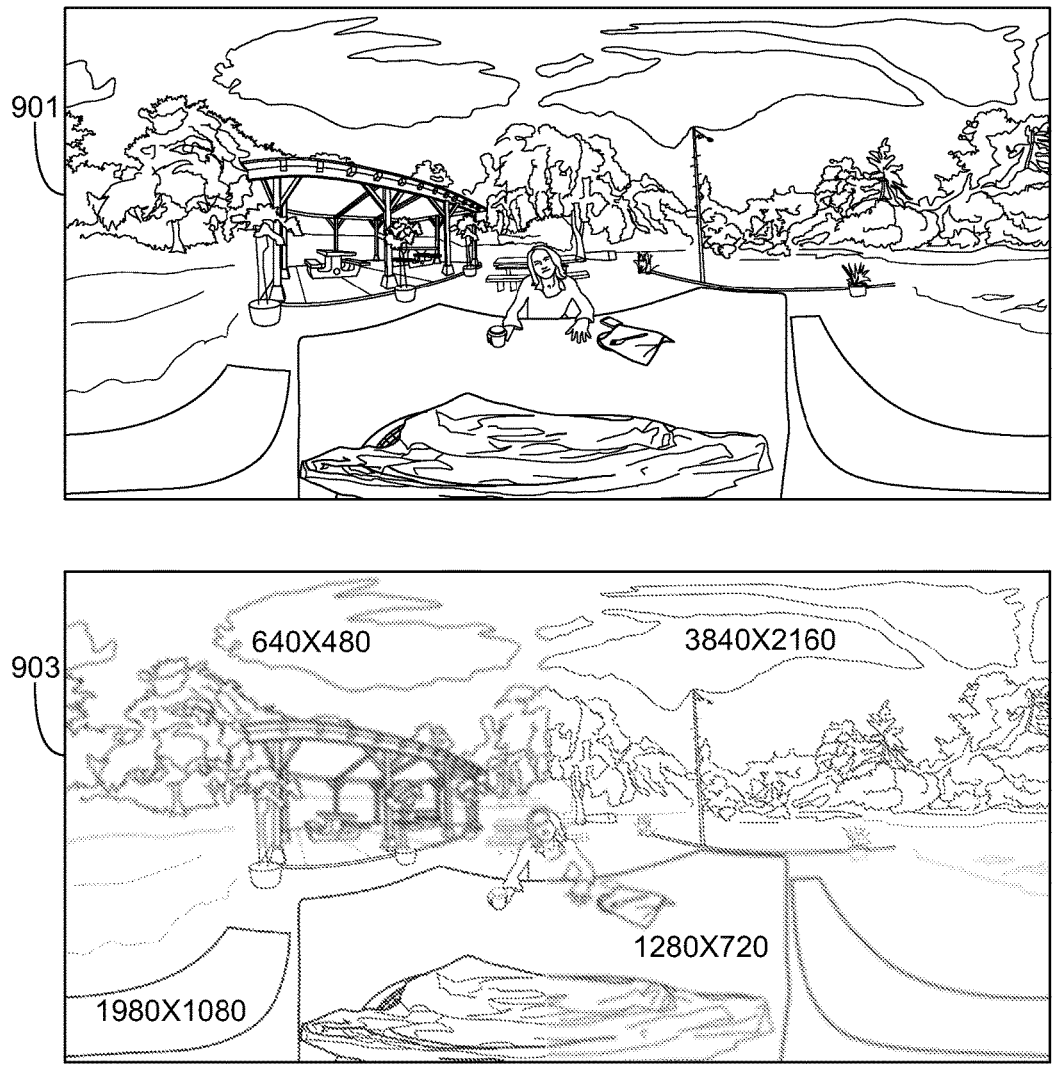
FIG. 9 shows illustrative information in accordance with principles of the invention.

FIG. 9 shows an illustrative embodiment of adaptive streaming of VR content. Adaptive streaming may divide VR content (video and audio assets) into data segments. Each data segment may be streamed to viewing device according to different performance considerations. The performance considerations may include latency and bandwidth optimization.

For example, a space behind a viewer's head may be less likely to be viewed when there is an event (as perceived by a viewer) occurring in front of the viewer. Adaptive streaming may not render a spherical surface perceived as being "behind" the viewer as finely as a spherical surface perceived as being "in front" of the viewer. VR content corresponding to a spherical surface behind the viewer may be sourced from a rendition have a lower resolution than VR content displayed in front of the viewer.

Analysis of metadata associated with VR content may be used to determine areas that are more or less likely to be viewed than others. Based on analysis of the metadata, commonly followed narrative paths through the VR content may be prioritized for low latency streaming. Adaptive streaming based on metadata analytics may provide a smooth response to viewer movement (and associated focal point changes) when streaming VR content. Metadata may include demographic data associated with a viewer, VR content, viewer location, CDN location or any suitable demographic data.

FIG. 9 includes snapshot 901 of VR content. Snapshot 901 may represent equirectangular data displayed for one eye of a viewer. Snapshot 901 shows displayed VR content depicted in a uniform resolution. FIG. 9 also includes snapshot 903. Snapshot 903 shows different resolutions associated with different areas of the displayed VR content. The different areas may correspond to different surface location on a spherical-hull perceived by a viewer, such as spherical-hull 705 (shown in FIG. 7). VR content mapped onto each of the surface areas may correspond to a data segment.

For example, VR content displayed in the upper right area of snapshot 903 is rendered at a resolution of 3840×2160. Metadata analytics may anticipate that a viewer's attention may be focused on the upper right area. Other areas of Snapshot 903 are rendered at lower resolutions than the upper right area. Metadata analytics may anticipate that it is less likely for the viewer to be focused on those areas rendered in lower resolutions.

Figures 10, 11:
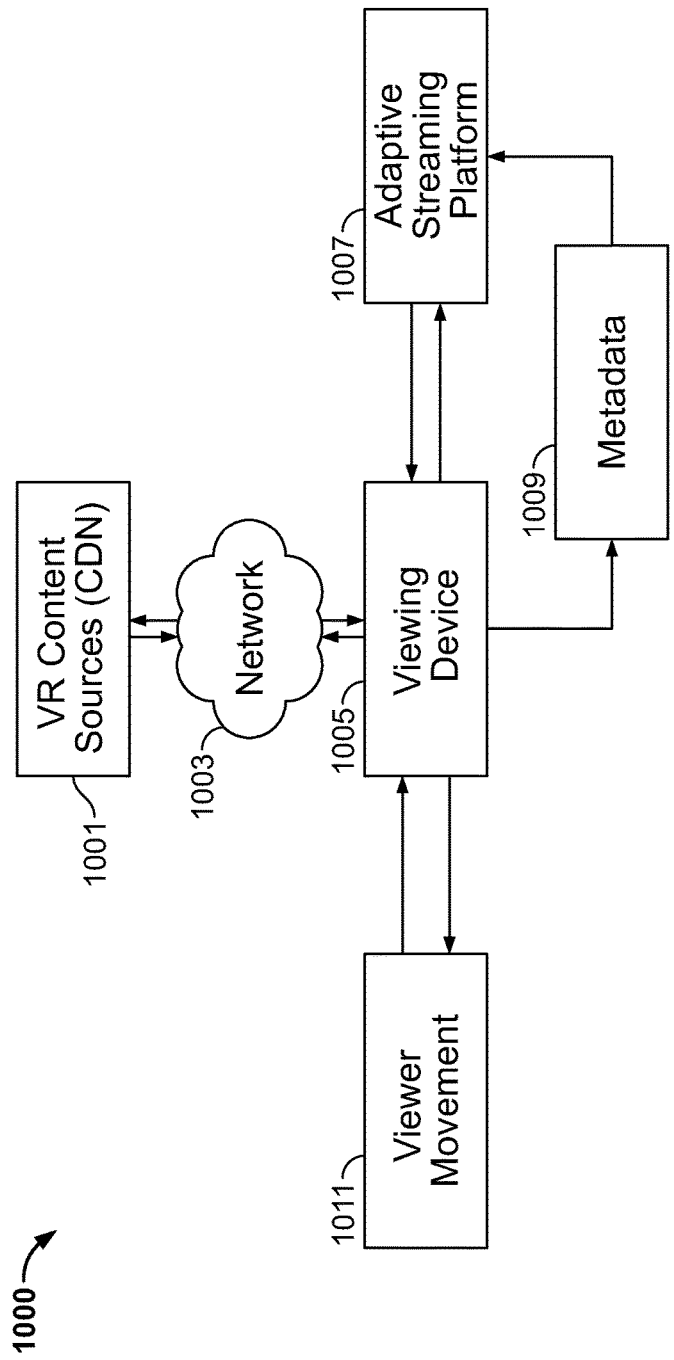
FIG. 10 shows illustrative apparatus in accordance with principles of the invention.
FIG. 11 shows illustrative information in accordance with principles of the invention.

FIG. 10 shows illustrative architecture 1000. Architecture 1000 includes sources 1001 of VR content. Sources 1001 may include one or more CDNs. Viewing device 1005 may access sources 1001 via network 1003. Adaptive streaming platform 1007 may direct viewing device to request VR content from one or more of sources 1001. Adaptive streaming platform 1007 may be run on viewing device 1005. Adaptive streaming platform 1007 may instruct viewing device 1005 to request a specific data segment size, specific resolution or specific VR asset. Adaptive streaming platform 1007 may instruct viewing device 1005 to request VR content from a specific geographic location at a specific time.

Adaptive streaming platform 1007 may instruct viewing device 1005 to request VR content based on metadata associated with the streamed VR content. Adaptive streaming platform 1007 may instruct viewing device 1005 to request VR content based on registered metadata associated with the VR content streamed by other viewers. The metadata may be registered by viewing device 1005. Viewing device 1005 may analyze metadata stored on sources 1001. Adaptive streaming platform 1007 may register metadata stored on viewing device 1005 by other apps or entered by the viewer.

Viewing device 1005 may transmit metadata to a server, such as server 101 (shown in FIG. 1) for analysis. The server may analyze metadata received from viewing 1005 (or multiple viewing devices) and provide feedback to viewing device 1005. The feedback may include adjust a quality bit rate, changing a resolution file source for streamed VR content, changing a data segment size or any suitable feedback responsive to the metadata analysis.

Viewer movement 1011 may be detected by viewing device 1005. Viewing device 1005 may communicate viewer movement 1011 to streaming platform 1007. Based on viewer movement 1011, adaptive streaming platform 1007 may direct viewing device 1005 to request a specific data segment of the VR content stored in sources 1001.

FIG. 11 shows illustrative metadata record 1101. Metadata record 1101 includes illustrative metadata fields 1103-1115 that may be registered by apparatus and methods described herein. Field 1103 includes a timestamp. The timestamp may be used to identify a time and/date metadata is registered. The timestamp may be used to identify VR content associated with registered metadata. For example, a length of VR content, such as a movie, may be 1 hour. Field 1103 may indicate that metadata stored in metadata record 1101 is associated with the VR content displayed to a viewer at 47 minutes from the beginning ($t_0$) of the VR content. Field 1103 may correspond to a VR asset or data segment.

Metadata record 1101 includes device ID field 1105. Apparatus and methods for adaptive streaming may be device agnostic. Registered Metadata may identify a viewing device. Apparatus and methods may select a rendition of VR content to stream based on an identity of the viewing device. For example, some devices may more efficiently process high resolution files. Other devices may more efficiently process audio files. Each device may include a different size screen. Apparatus and methods may select a rendition file for displaying the VR content on a specific screen size.

Metadata 1101 includes VR content ID field 1107. Apparatus and methods may adaptively adjust streaming based on the VR content requested by a viewer. For example, some "action" content may require faster flow of data segments for specific assets of the VR content.

Metadata record 1101 includes narrative path field 1109. Narrative path field 1109 may indicate a narrative path taken by the viewer through VR content. Narrative path field 1109 may influence how the VR content is streamed in response to the viewer of to another viewer that requests the VR content.

Metadata record 1101 includes demographics field 1111. Demographics field 1111 may include age, gender, location, socioeconomic status or any suitable information about a viewer or viewer location.

Metadata record 1101 includes focal point position 1113. A frequency of how often metadata is registered may depend on how often the viewer focal point shifts. Viewer focal point field 1113 may also indicate how many viewers have focused on a particular VR asset of other VR content.

Metadata record 1101 includes bandwidth field 1115. Bandwidth field 1115 may indicate a bandwidth associated with streaming of the VR content.

One or more field of metadata record 1101 may be correlated to one or more other fields of the metadata record. A plurality of metadata records 1101 may be registered by a plurality of viewing devices.

FIGS. 12-17 show illustrative tools for recording and analyzing registered metadata. Metadata may be registered with a high degree of detail. The registered metadata may provide a determination of what VR content viewers focused on and how the viewers reacted to the VR content presented to them.

Registered metadata may be collected and stored. The stored metadata may be processed to produce derived data sets usable by VR content producers. Derived data sets may be used to generate "heat-maps" of overall viewer interaction and reaction to VR content. The derived data sets may allow for granular time controlled analysis of viewer reaction or viewing device performance with respect to VR content. Derived data set may provide insight into viewer reactions to events depicted within the VR content. Such insight may allow content producers to run their own tests and campaigns on the registered metadata using a controlled API. Such insight may allow content producers to adjust narrative paths associated with the VR content or add narrative nodes/assets. Demographic based information may be combined or correlated with registered metadata.

Figure 12:
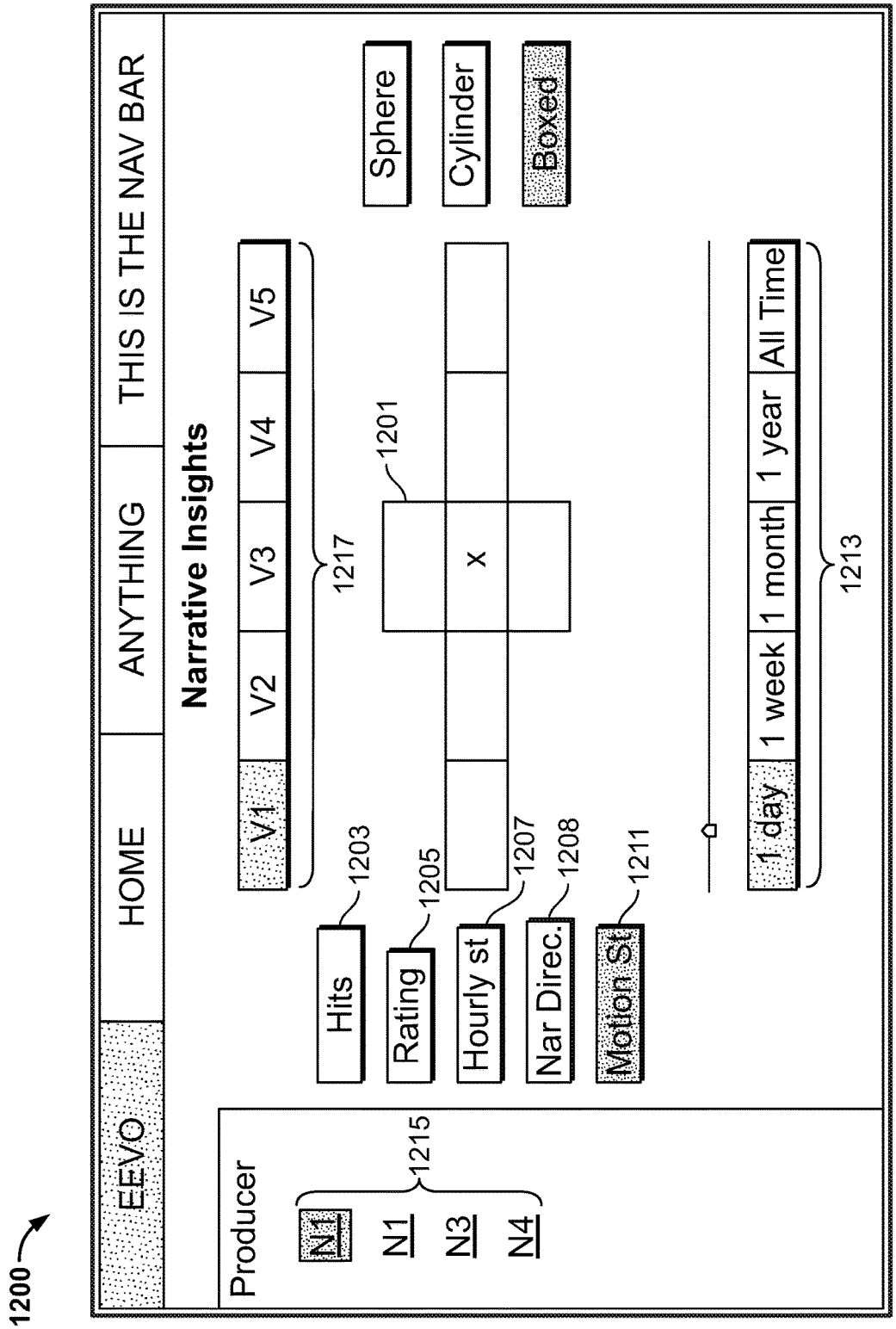
FIG. 12 shows illustrative information in accordance with principles of the invention.

FIG. 12 illustrative screenshot 1200 of a user interface for viewing analysis of registered metadata. Screenshot 1200 shows registered metadata associated with a surface of a cubic or boxed frame-of-reference 1201 for displaying VR content. Options 1213 show that a user may have viewer metadata registered for a given day, week, month, year or any other suitable time period. Options 1215 show that a user may viewer registered metadata associated with narrative nodes of VR content. Option 1203 shows that a user may view a number of hits or how many times VR content has been viewed by viewers.

Options 1217 show that metadata analysis may be specific to different versions of VR content. Version of VR content may differ based on source location, resolution, product placement or any suitable criteria.

Option 1205 shows that metadata may be used to generate a rating of VR content. VR content may be rated based on latency, streaming quality, narrative or any suitable criteria.

Option 1207 shows that metadata may be analyzed to generate hourly statistics. The hourly statistics may reflect popularity of VR content, streaming performance of the VR content or any suitable statistics.

Option 1208 shows that metadata may be analyzed to track one or more narrative paths taken by viewers while viewing VR content. Option 1208 may indicate more popular narrative paths or that viewer demographics affect the narrative path taken by a viewer.

Option 1211 shows that that metadata may be analyzed to generate statistics on viewer movement when viewing VR content. For example, the metadata analysis may be utilized to show that viewers move in a predictable fashion in response to viewing specific VR content. The metadata analysis may be further utilized to adaptively stream VR content based on predicted viewer movement.

Figure 13:
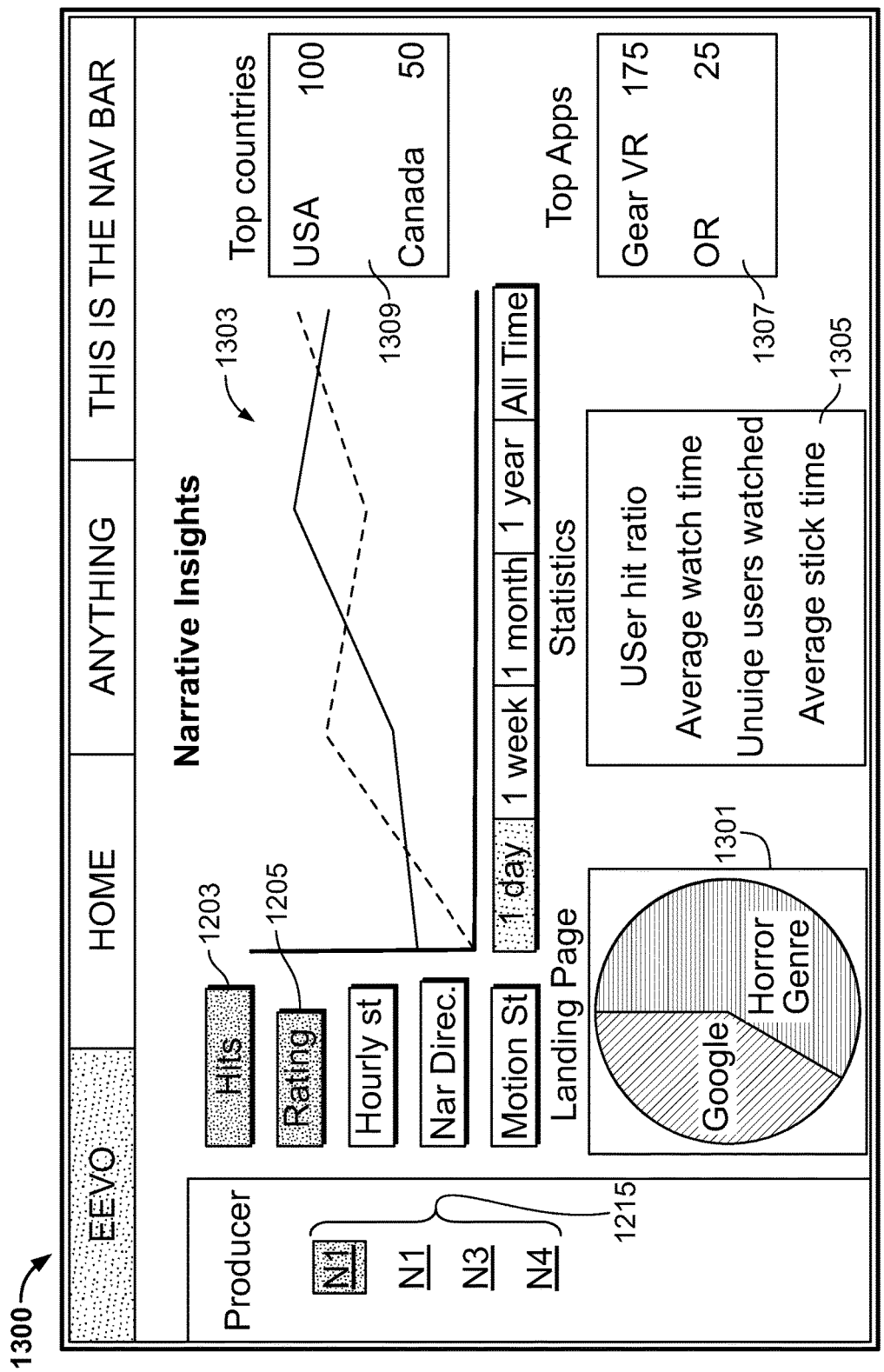
FIG. 13 shows illustrative information in accordance with principles of the invention.

FIG. 13 shows illustrative screenshot 1300 of a user interface for viewing analysis of registered metadata. Screenshot 1300 shows illustrative line graph data 1303. Line graph 1303 may be derived from registered metadata. Screenshot 1300 shows that multiple options may be selected and plotted on one graph. Screenshot 1300 shows that options 1203 (number of hits) and option 1205 (rating of VR content) are both plotted on line graph 1303 over a one day time period.

In display 1307, screenshot 1300 shows that registered metadata may include a landing page accessed by a viewer when seeking to locate VR content. The landing page may indicate whether the viewer has located desired VR content using a generic search engine (e.g., Google) or has used a more specialized search or searching tool (e.g., "Horror Genre").

Screenshot 1300 shows that statistics 1305 may be generated based on registered metadata. Statistics 1305 include how many viewers experience a particular VR content, how long those viewers have watched the VR content, how many viewers are unique and average stick time. Average stick time may include how long a viewer has stayed on an asset of VR content.

In display 1307, screenshot 1300 shows that registered metadata may include "top apps" run on VR content viewing devices. A "top" app may be determined based on popularity, performance of the app or any suitable criteria.

In display 1309, screenshot 1300 shows that registered metadata may include a location (e.g., USA, Canada) associated with a viewer and viewing device (e.g., Samsung Gear VR, Oculus Rift) used to access VR content.

Figure 14:
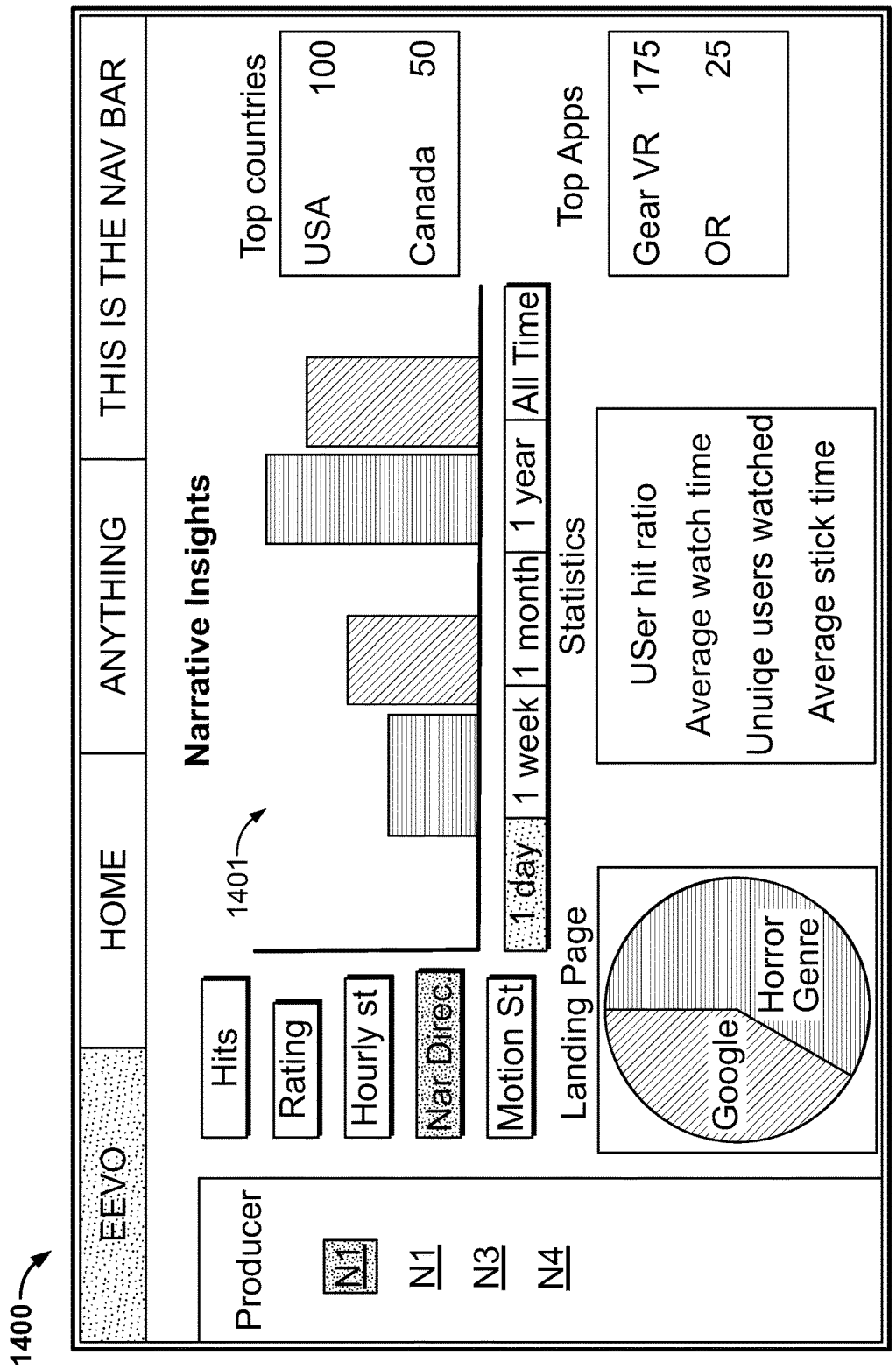
FIG. 14 shows illustrative information in accordance with principles of the invention.

FIG. 14 shows illustrative screenshot 1400 of a user interface for viewing analysis of registered metadata. Screenshot 1400 includes bar graph 1401. Bar graph 1401 shows a number of viewers that have taken a particular narrative path when experiencing VR content. Bar graph 1401 may be derived from registered metadata. Each narrative node may include two or more narrative paths "branching" out of the node.

Figure 15:
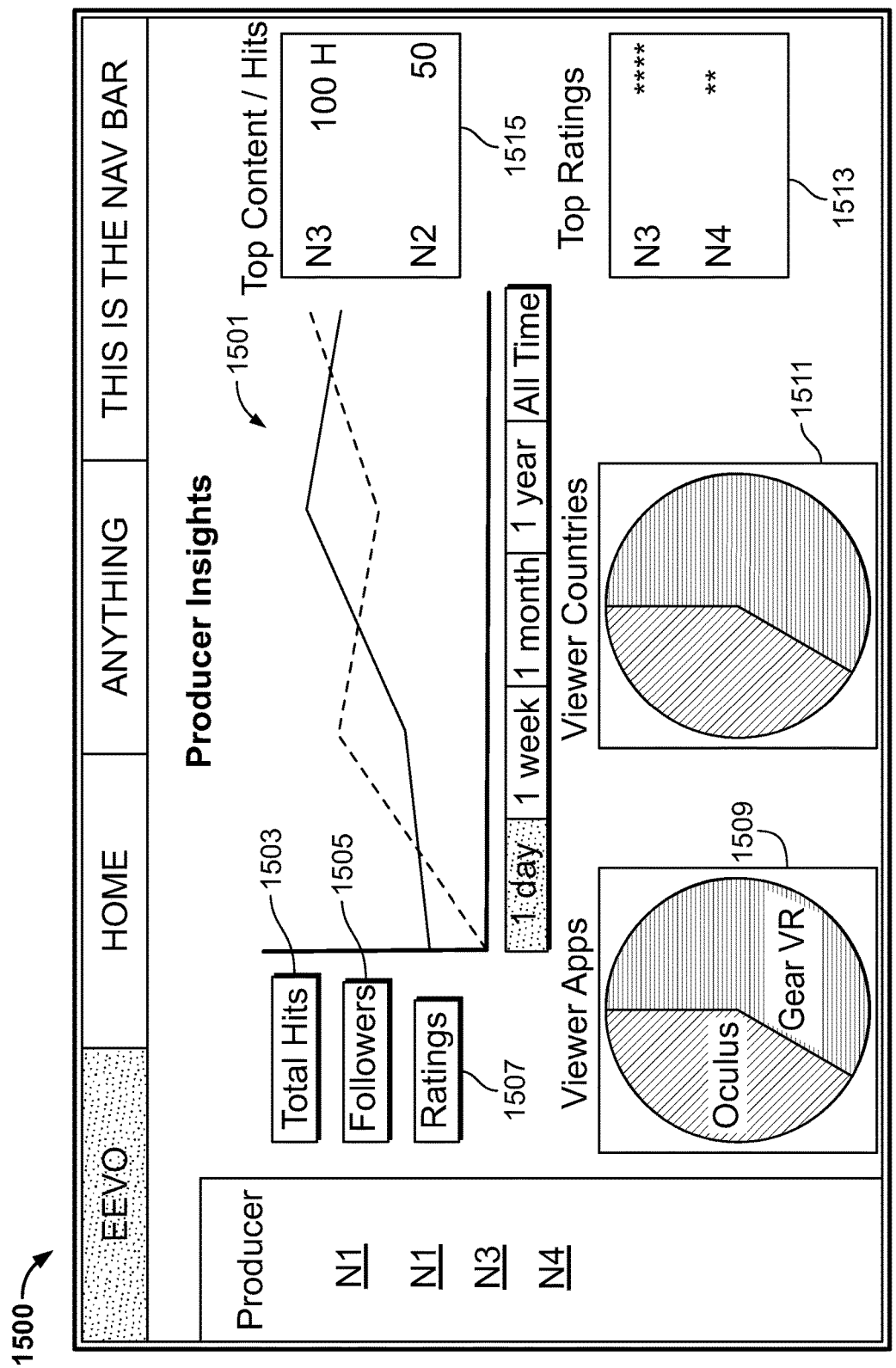
FIG. 15 shows illustrative information in accordance with principles of the invention.

FIG. 15 shows illustrative screenshot 1500 of a user interface for viewing analysis of registered metadata. Screenshot 1500 includes line graph 1501. Line graph 1501 may show two or more of options 1503, 1505 or 1507 plotted over a time period. For example, registered metadata may be used to determine a total number of times VR content has been accessed (option 1503). Registered metadata may be used to determine a total number of viewers following a narrative VR content series (option 1505). Registered metadata may be used to determine viewer ratings of VR content (option 1507).

Screenshot 1500 shows that registered metadata may be used to track how many times a particular viewing device has been used to access VR content. Illustrative display 1509 shows that a Samsung Gear VR device has been used more frequently than an Oculus Rift device. Based on display 1509, a producer of the VR content may investigate whether the VR content is being experienced in a different way by viewers using the Oculus device.

Display 1511 shows that registered metadata may be used to track how many times a viewer has accessed VR content from a particular country. Display 1513 shows that registered metadata may be used to determine which narrative nodes part of VR content have been most popular or highly rated among viewers.

Display 1515 shows that registered metadata may be used to determine which narrative nodes within VR content have viewed most often by viewers.

Screenshot 1500 shows illustrative displays for narrative nodes. Registered metadata may be used to generate ratings and hits for data segments, VR assets, CDNs accessed or any other suitable criteria.

Figure 16:
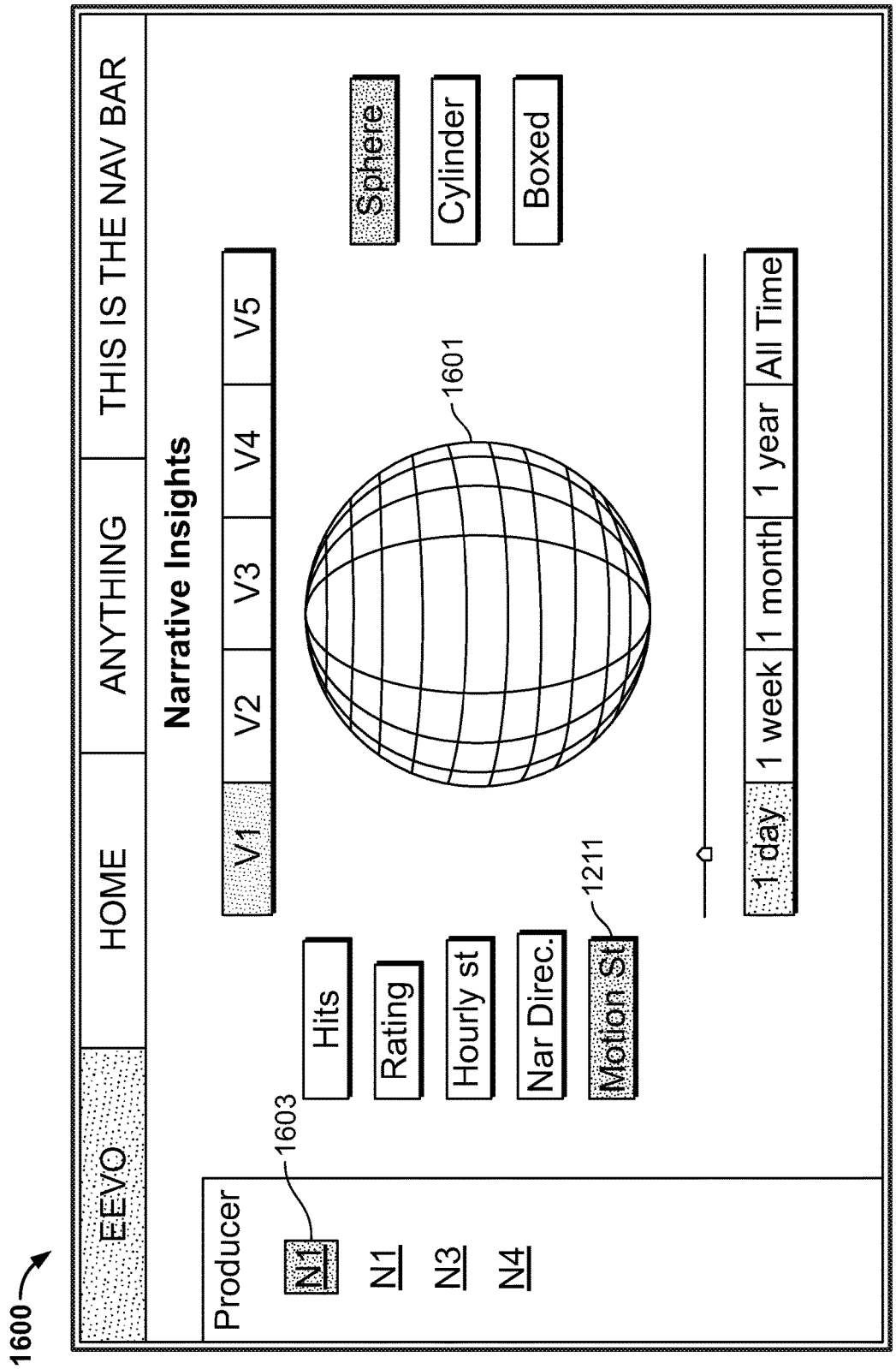
FIG. 16 shows illustrative information in accordance with principles of the invention.

FIG. 16 shows illustrative screenshot 1600 of a user interface for viewing analysis of registered metadata. Screenshot 1600 shows that registered metadata may be correlated to VR content mapped onto a spherical-hull (as shown in FIG. 7). Registered metadata may be correlated to surface location on a spherical-hull (such as surface portion 703 shown in FIG. 7) to provide visual indication of where viewers focused at different times while experiencing VR content.

Registered metadata may indicate viewers' movements in response to VR content displayed to the viewers. Screenshot 1600 shows that registered metadata may be used to generate a visual analysis for a particular narrative node 1603 (N1). Registered metadata may be used to generate a visual analysis for two or more narrative nodes of VR content.

Figure 17:
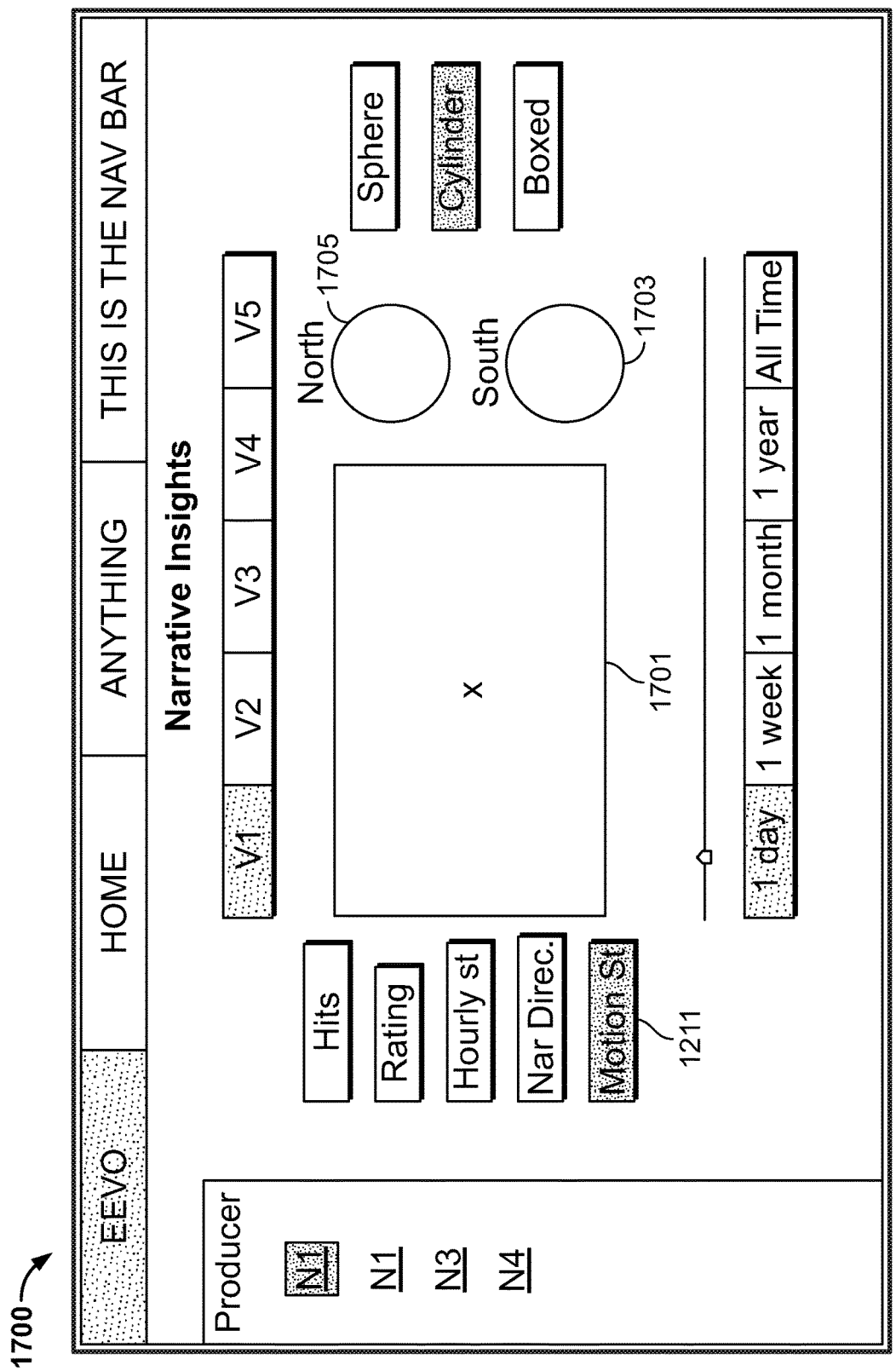
FIG. 17 shows illustrative information in accordance with principles of the invention.

FIG. 17 shows illustrative screenshot 1700 of a user interface for viewing analysis of registered metadata. Screenshot 1700 shows that registered metadata may be correlated to VR content as mapped onto a cylindrical shape. A cylindrical shape may be used as a frame-of-reference to provide visual indication of where viewers where focused at different times while experiencing VR content. A cylindrical shape may be used as a frame-of-reference to determine where a viewer is focused and to determine the VR content that should be displayed to the viewer.

Registered metadata correlated to VR content displayed on surface 1701 that extends along a longitudinal axis of the cylinder. Registered metadata correlated to VR content displayed on plane 1703 that intersects the longitudinal axis of the cylinder. Plane 1703 may correspond to a bottom of the cylindrical shape. Registered metadata correlated to VR content displayed on plane 1705 that intersects the longitudinal axis of the cylinder. Plane 1705 may correspond to a top of the cylindrical shape.

Figure 18:
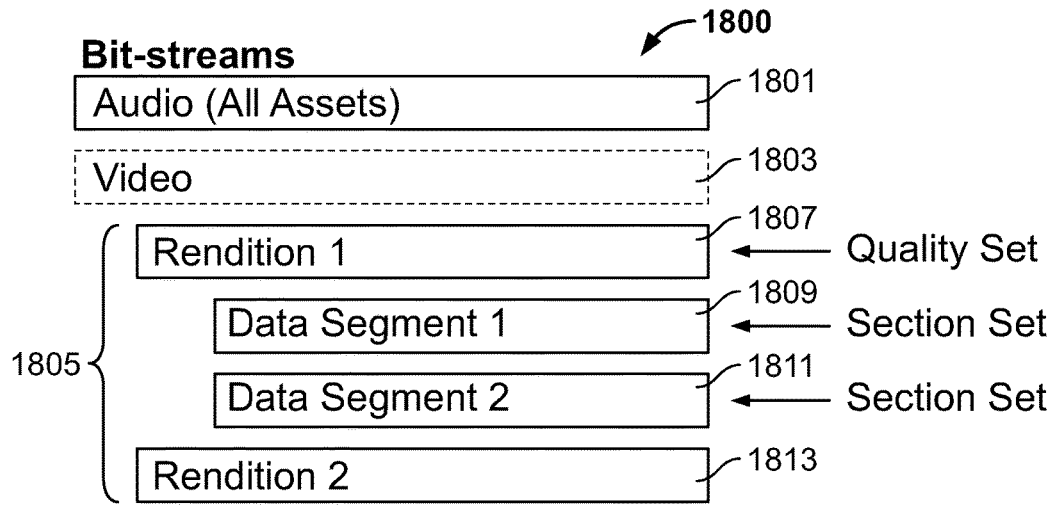
FIG. 18 shows illustrative information in accordance with principles of the invention.

FIG. 18 shows illustrative bit-streams 1800. Bit-streams 1800 includes audio stream 1801. In some embodiments, audio stream 1801 may include data segments for all audio assets associated with a piece of VR content. Some embodiments may include a plurality of audio streams.

Bit-streams 1800 include video stream 1803. In some embodiments, video stream 1803 may be a single bit-stream that includes data-segments for a plurality of video assets. For example, data-segments within bit-streams 1805 may be collapsed into video steam 1803. In some embodiments, audio stream 1801 and video stream 1803 may be collapsed into a single bit-stream.

In some embodiments, two or more data-segments may be associated with a discrete bit-stream. FIG. 18 shows that data segments 1809 and 1811 may be streamed using rendition 1807. In some embodiments, no more than data segments 1809 and 1811 may be needed to fully render a viewer focal area at a first point in time during playback of VR content.

At second point in time during playback of the VR content, a third data-segment (not shown) may be streamed using rendition 1813. In some embodiments, no more than the third data segment may be needed to fully render a viewer focal area at a second point in time during playback of VR content. Rendition 1807 and rendition 1813 may be of different bit-rates or resolutions.

Figure 19:
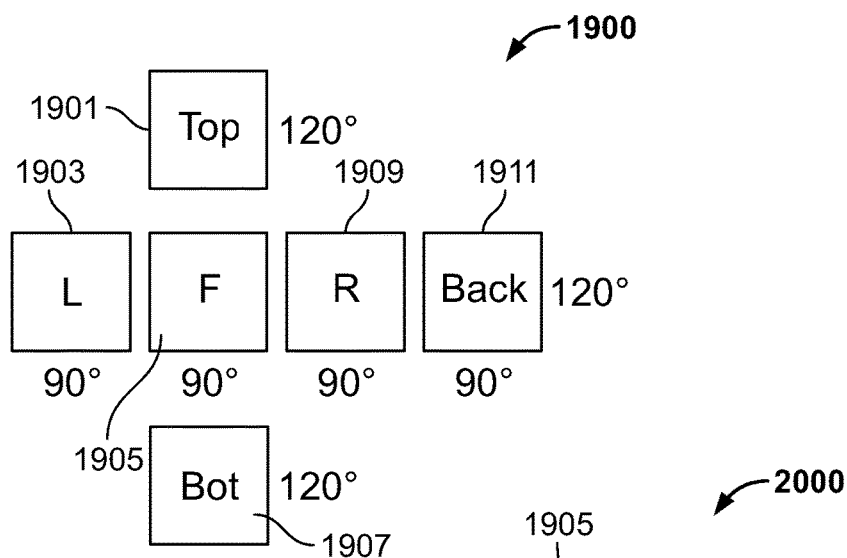
FIG. 19 shows illustrative information in accordance with principles of the invention.

FIG. 19 shows illustrative data segments 1900. FIG. 19 shows that an asset may be sectioned into six data segments. An asset may be sectioned into any suitable number of data segments. For example, an asset may be sectioned into more or less than six data segments.

Data segments 1900 may be mapped onto a spherical-hull, such as spherical-hull 705 (shown in FIG. 7). A data segment, such as front data segment 1905, may be mapped to a spherical surface, such as surface 703 (shown in FIG. 7). Collectively, data segments 1900 may be perceived as enveloping a viewer. Collectively, data segments 1900 may correspond to a VR video frame.

Each of data segments 1901, 1903, 1905, 1907, 1909 and 1911 may be streamed to a viewing device. Less than all of data segments may be streamed to the viewing device. For example, based on an expected position of a viewer focal area (e.g., with respect to spherical-hull 705), only data segment 1905 may be streamed to a viewing device.

Each of data segments 1901, 1903, 1905, 1907, 1909 and 1911 may be streamed to a viewing device from a rendition. Each of data segments 1901, 1903, 1905, 1907, 1909 and 1911 may be streamed from a discrete rendition. Two or more of data segments 1901, 1903, 1905, 1907, 1909 and 1911 may be streamed from the same rendition.

FIG. 19 shows that each of data segments 1900 is 90° wide and 120° tall. Data segments 1903, 1905, 1909 and 1911 may be positioned with their wide sides next to each other to present VR content over a spherical surface area that measures 120°×360°. Data segments 1901, 1905 and 1907 may be positioned with their tall sides next to each other to cover a spherical surface area that measures 90°×360°. Collectively, data segments 1900 may include VR content that covers an entire surface area of a spherical-hull, such as spherical-hull 705 (shown in FIG. 7).

Figure 20:
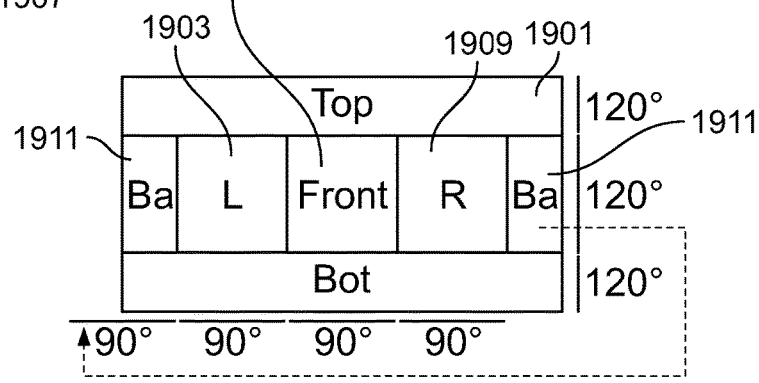
FIG. 20 shows illustrative information in accordance with principles of the invention.

FIG. 20 shows illustrative positioning 2000 of data segments 1900 (shown in FIG. 19). FIG. 20 shows that data segment 1911 "wraps around" a spherical-hull. FIG. 20 shows that distortion may be applied to one or more of data segments 1900 when they are mapped onto a spherical-hull.

Figure 21:
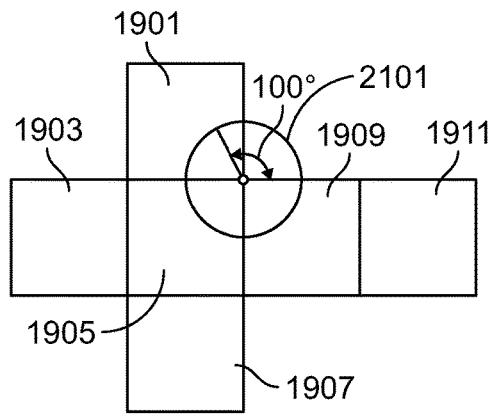
FIG. 21 shows an illustrative scenario in accordance with principles of the invention.

FIG. 21 shows illustrative scenario 2100. Scenario 2100 shows viewer focal area 2101 directed at an intersection of data segment 1901, data segment 1905 and data segment 1909. If, for example, viewer focal area 2101 is 100° wide, then only data segments 1901, 1905 and 1909 may be streamed and decoded by a viewing device. Network bandwidth and computational resources would be conserved by not streaming and decoding data segments 1903, 1907 and/or 1911.

Figure 22:
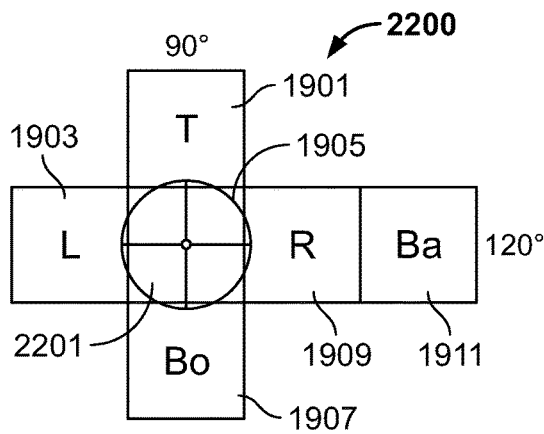
FIG. 22 shows an illustrative scenario in accordance with principles of the invention.

FIG. 22 shows illustrative scenario 2200. Scenario 2200 shows viewer focal area 2201 directed toward a center of the data segment 1905. If, for example, viewer focal area 2201 is 100° wide, then only data segments 1905 may be streamed and decoded by a viewing device. Network bandwidth and computational resources would be conserved by not streaming and decoding data segments 1901, 1909, 1903, 1907 and/or 1911.

Figure 23:
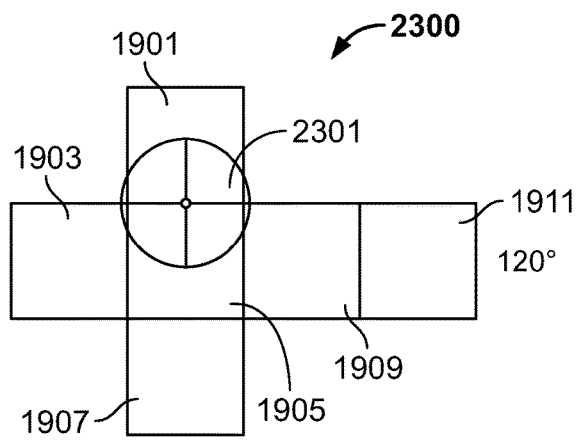
FIG. 23 shows an illustrative scenario in accordance with principles of the invention.

FIG. 23 shows illustrative scenario 2300. Scenario 2300 shows viewer focal area 2301 directed toward a boundary between data segment 1901 and 1905. Each of data segments 1900 may be 90° wide and viewer focal area 2301 may be 100° wide. FIG. 23 shows that viewer focal area 2301 may overlap with data segments 1903 and 1909. In some embodiments, when viewer focal area 2301 is positioned as shown, data segments 1901, 1905, 1903 and 1909 may be streamed to a viewing device.

Figure 24:
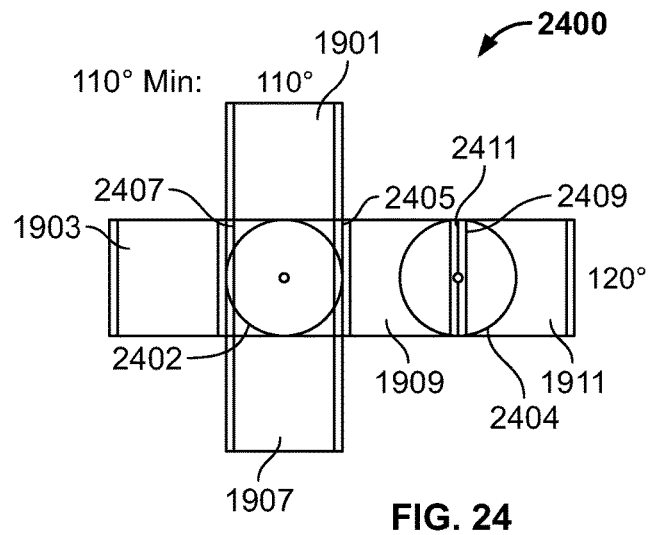
FIG. 24 shows an illustrative scenario in accordance with principles of the invention.

FIG. 24 shows illustrative scenario 2400. Scenario 2400 includes right-eye focal area 2404 and left-eye focal area 2402. Focal areas 2404 and 2402 may be larger than any one of data segments 1900. Because focal areas 2404 and 2402 are larger than any one of data segments 1900, at least two or more data segments would be typically streamed to the viewing device.

Scenario 2400 shows that to reduce a number of streamed data segments, filler data segments may be added to data segments 1900. The filler data segments may repeat information in an adjacent data segment. The filler data segments may effectively expand a size of each data segment and increase a likelihood that only one data segment may be required to fully cover a focal area. The filler data segments may also expand a size of each data segment to be equal to, or larger than a focal area.

When each data segment is equal to, or larger than the focal area only a maximum of three data segments may be required to cover any position of the focal area when without the filler data segments four data segments would have been required (such as in scenario 2300 where four data segments were required to cover viewer focal area 2301). Network bandwidth and computational resources would be conserved by not streaming and decoding unnecessary data segments.

Filler data segment 2405 may repeat VR content in data segment 1909. Filler data segment 2407 may repeat VR content in data segment 1903. Filler data segment 2409 may repeat VR content in data segment 1909. Filler data segment 2411 may repeat VR content in data segment 1911.

Figure 25:
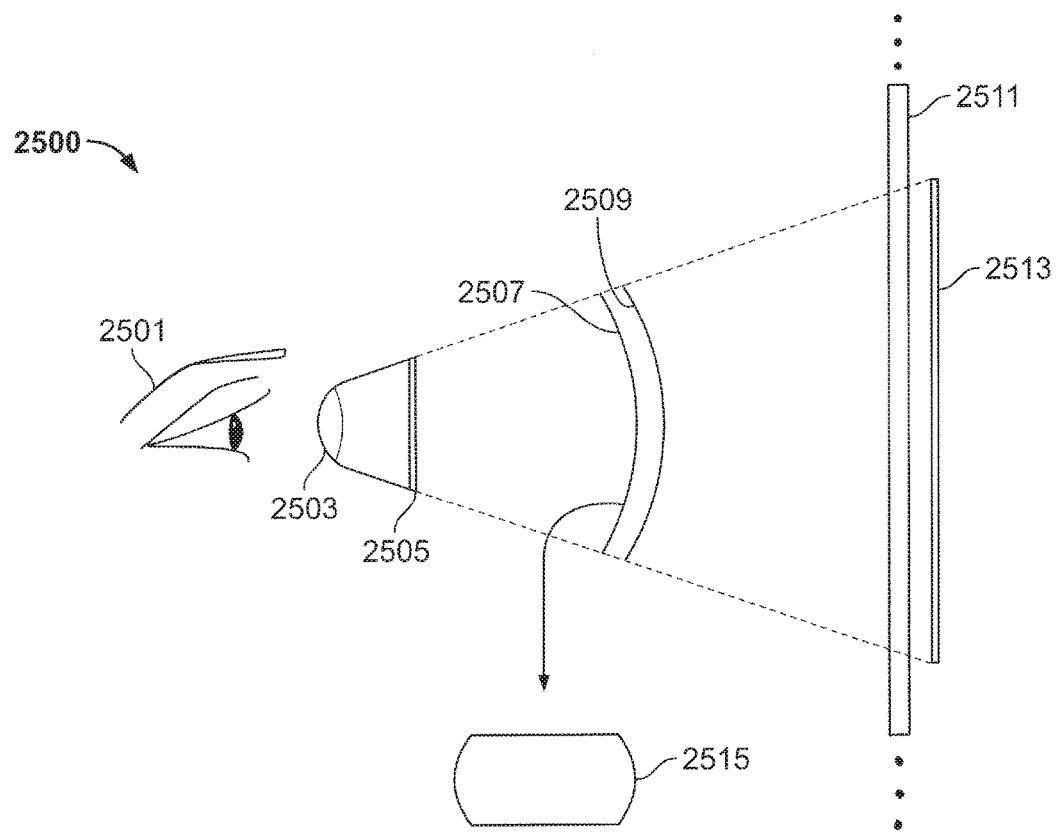
FIG. 25 shows an illustrative scenario in accordance with principles of the invention.

FIG. 25 shows illustrative scenario 2500. Scenario 2500 shows viewer 2501 experiencing VR content by looking through lens 2503 at a viewing device 2505. When experiencing the VR content, viewer 2501 may perceive to be enveloped by VR content mapped to surface of a spherical-hull.

Scenario 2500 shows spherical surface area 2507 of a spherical-hull perceived by viewer 2501. FIG. 25 also shows a straight-on view 2515 of spherical surface area 2507. Spherical surface area 2507 may correspond to a focal area of viewer 2501. When experiencing playback of the VR content, viewer 2501 may be unable to view video content outside of the focal area.

Data segment 2509 of VR content may be mapped to spherical surface area 2507.

FIG. 25 shows a projection 2513 of data segment 2509. FIG. 25 shows projection 2511 of a total amount of VR content (complete video frame) needed to completely cover a surface of a spherical-hull. FIG. 25 shows that projection 2513 may be smaller than projection 2511. Embodiments may include selectively streaming data segment 2509 to viewing device 2505. Selectively streaming data segment 2509 without streaming complete video frame (represented by projection 2511) may reduce bandwidth usage, reduce computational overhead expended by viewing device to decode projection 2511 and provide viewer 2501 provides a viewer with an immersive on-demand VR experience.

Persons skilled in the art will appreciate that the present invention can be practiced by other than the following exemplary embodiments, which are presented for purposes of illustration rather than of limitation:

Exemplary Embodiments:

1. A method for streaming virtual reality ("VR") content, the method comprising:
   receiving a request from a viewing device to stream the VR data to the viewing device;
   establishing a connection from the device to a rendition of the VR data stored at a location remote from the viewing device;
   extracting a set of data segments from the rendition;
   packaging each member of the set of data segments; and
   streaming each member of the set of data segments to the viewing device over the connection.

2. The method of embodiment 1 further comprising:
   queuing each member of the set of data segments in an array of buffers on the viewing device;
   projecting a first member of the set of data segments onto a screen of the viewing device; and
   extracting a second member of the set of data segments from the array; and
   projecting the second member of the set of data segments onto the screen.

3. The method of embodiment 2 further comprising:
   projecting the first member of the set of data segments onto a first position of the screen; and
   projecting the second member of the set of data segments onto a second position of the screen.

4. The method of embodiment 2 further comprising, in response to a shifting of a viewer focal area:
   extracting the second member; and
   projecting the second member.

5. The method of embodiment 2 wherein:
   the first position is within a viewer focal area;
   the second position is outside the viewer focal area; and
   the method further comprises, projecting the second member of the set of data segments onto the second position of the screen before the viewer focal area shifts to include the second position.

6. The method of embodiment 2 further comprising:
   projecting the first member of the set of data segments onto a position of the screen; and
   in response to detection of a first shifting of a viewer focal area, extracting a second set of data segments from the rendition;
   streaming the second set of data segments to the device;
   queuing the second set of data segments in the array such that in response to a second shifting of the viewer focal, the second set of data segments are configured to replace a first member of the first set of data segments.

7. The method of embodiment 6 wherein the second set of data segments are of a lower resolution than the first set of data segments.

8. The method of embodiment 1 wherein, the set of data segments is a first set, and the rendition is a first rendition located at a first location remote from the device, the method further comprises:
   identifying a second rendition located at a second location remote from the device;
   extracting a second set of data segments from the second rendition; and
   streaming each member of the set of data segments to the viewing device.

9. The method of embodiment 8 further comprising identifying of the second rendition file in response to a decrease in the bandwidth over the connection.

10. The method of embodiment 8 further comprising identifying the second rendition file in response to detection of a pre-determined narrative node within the VR data having a predetermined size.

11. The method of embodiment 1 wherein the first member of the set of data segments corresponds to data that is processed by the viewing device to be experienced by the viewer as being on a surface of a spherical-hull.

12. The method of embodiment 11 wherein the spherical-hull is centered around the viewer.

13. The method of embodiment 1 further comprising:
    detecting one or more performance characteristics of the viewing device;

identifying the rendition and determining the remote location based on the one or more performance characteristics.

14. A method for streaming a virtual reality ("VR") video data, the method comprising:
sensing available bandwidth on a network connection linking a receiver of a viewing device to remote location storing one or more renditions of the VR video data;
based on the available bandwidth, selecting a first rendition of the VR video data;
transmitting a first set of data segments, extracted from the first rendition, to the viewing device;
monitoring a focal point of a viewer relative to a display of a member of the first set of segments on a screen of the viewing device;
in response to a change in the focal point, transmitting a second set of data segments to the viewing device.

15. The method of embodiment 14 wherein the second set of data segments is associated with a second rendition of the VR video data.

16. The method of embodiment 14 wherein the first set of data segments are associated with a first resolution and the second set of data segments are associated with a second resolution.

17. The method of embodiment 14 wherein the first set of data segments comprises a plurality of data segments, each data segment being a member of the first set:
first members of the first set of data segments are associated with a first resolution; and
second members of the first set of data segments are associated with a second resolution.

18. The method of embodiment 14 wherein the second set of data segments is narratively linked to the first set of data segments.

19. The method of embodiment 14 wherein:
the first set of data segments comprises a first narrative node of the VR video data; and
the second set of data segments comprises a second narrative node of the VR video data.

20. The method of embodiment 14 further comprising transmitting to the viewing device audio data associated with the first set of data segments.

21. The method of embodiment 14 further comprising storing first members of the first set of data segments in a first buffer on the device and storing second members of the first set of data segments in a second buffer on the viewing device.

22. The method of embodiment 21 further comprising replenishing the first buffer at a first refresh rate and replenishing the second buffer at a second refresh rate.

23. The method of embodiment 22 wherein the second refresh rate is selected in response to a change in the focal point.

24. The method of embodiment 14 further comprising transmitting a third set of data segments to the device before transmitting the second set of data segments.

25. The method of embodiment 24 further comprising selecting the third set of data segments based on a narrative sequence associated with the VR video data.

26. The method of embodiment 14 further comprising, in response to receiving the first set of data segments, mapping the first set of data segments onto a surface of a spherical-hull.

27. The methods of embodiment 26 further comprising applying shaders to the first set of data segments based on the mapping.

28. The method of embodiment 14 further comprising, in response to receiving the first set of data segments, projecting the first set of data segments onto the screen such that the first set of data segments appear, to the viewer, on a surface of a spherical-hull centered around the viewer.

29. The method of embodiment 26 further comprising, using the viewing device, displaying to the viewer:
first members of the mapped segments at a first time; and
second members of the mapped segments at a second time.

30. The method of embodiment 29 wherein:
at the first time the focal point of viewer corresponds to a first data segment of the VR video data; and
at the second time, the focal point of the viewer corresponds to a second data segment of the VR video data.

31. The method of embodiment 26 further comprising displaying to the viewer, using the viewing device:
a first number of the mapped segments in response to detection of a first focal point of the viewer on a first location on the surface; and
a second number of the mapped segments in response to detection of a second focal point of the viewer on a second location on the surface.

32. The method of embodiment 31 further comprising requesting transmission of the second set of data segments in response to detection of the first focal point on or near the first location on the surface.

33. The method of embodiment 14 further comprising displaying on the screen of the viewing device, members of the first set of data segments and members of the second set of data segments.

34. The method of embodiment 14 further comprising:
based on the bandwidth, determining a data segment size for each member of the second set of data segments; and
generating the second set of data segments based on the data segment size.

35. A system for streaming virtual reality ("VR") video data, the system comprising:
a receiver module of a viewing device configured to receive the virtual reality video data;
in response to receiving the virtual reality video data, the viewing device is configured to:
distribute:
a first segment of the video data to a first buffer;
a second segment of the video data to a second buffer; and
a third segment of the video data to the second buffer; and
display on a screen of the viewing device:
at a first time, the first data segment and the second data segment; and
at a second time, the first data segment and, in place of the second data segment, the third data segment.

36. The system of embodiment 35 wherein the second data segment is narratively linked to the third data segment.

37. The system of embodiment 35 wherein:
the first data segment is one of a first number of data segments;
the second data segment is one of a second number of data segments; and
the viewing device is further configured to fill the first buffer with the first number of data segments and the second buffer with the second number of data segments.

38. The system of embodiment 37 wherein the first number is different from the second number.

39. The system of embodiment 35 wherein the viewing device is configured to associate the first buffer with a first surface area of the screen and the second buffer with a second surface area of the screen.

40. The system of embodiment 39 wherein:
the first surface area of the screen corresponds to a first equirectangular projection; and
the second surface area of the screen corresponds to a second equirectangular projection.

41. The system of embodiment 37 wherein the viewing device is configured to project the first number of data segments stored in the first buffer onto a first surface area of the screen and the second number of data segments stored in the second buffer onto a second surface area of the screen.

42. The system of embodiment 41 wherein the first number of data segments stored in the first buffer is determined based on a position of the first surface area of the screen relative to a focal point of a viewer relative to a first video frame.

43. The system of embodiment 41 wherein the first number of data segments stored in the first buffer is determined based on a position of the first surface area of the screen relative to an expected focal point of a viewer.

44. The system of embodiment 43 wherein the expected focal point of the viewer is determined by the viewing device based on monitoring movement of the viewer.

45. The system of embodiment 43 wherein the expected focal point of the viewer is determined by the viewing device based on monitoring movement of the viewer with respect to a spherical-hull that envelopes the viewer.

46. The system of embodiment 35 wherein a number of data segments stored in the first buffer at the second time is determined based on a position of the first surface area of the screen.

47. The system of embodiment 35 wherein a number of data segments stored in the first buffer at the second time is determined based on a focal point of a viewer.

48. The system of embodiment 35 wherein a number of data segments stored in the first buffer at the second time is determined based on a position of the first data segment on a surface of a spherical-hull centered about the viewer.

49. The system of embodiment 35 wherein a number of data segments stored in the first buffer at the second time is determined based on a number of changes in a focal point of a viewer between the first time and the second time.

50. The system of embodiment 35 wherein a number of data segments stored in the first buffer at the second time is determined based on a position of a viewer focal point at the first time with respect to a surface of a spherical-hull centered about the viewer.

51. The system of embodiment 35 wherein the receiver module is configured to receive audio data associated with the virtual reality video data.

52. The system of embodiment 51 wherein storage of the audio data is shared between the first buffer and the second buffer.

53. The system of embodiment 51 wherein the audio data is played to a viewer based on a focal point of the viewer.

54. The system of embodiment 51 wherein the audio data is played to a viewer based on a focal point of the viewer relative to a location of the first data segment on a surface of a spherical-hull centered about the viewer.

55. The system of embodiment 35 wherein:
the first data segment is associated with a first resolution; and
the second data segment is associated with a second resolution.

56. The system of embodiment 55 wherein the processor is configured to request transmission VR video data associated with the first or the second resolution in response to bandwidth available for the receiving module to receive the requested VR video data.

57. The system of embodiment 56 wherein a size of the third data segment is determined based on a change in the available bandwidth.

58. The system of embodiment 57 wherein the change in bandwidth occurs between the first time and the second time.

59. The system of embodiment 35 wherein a size of the third data segment is determined based on a position of the viewer focal point with respect to the VR video data displayed to the viewer.

60. The system of embodiment 35 wherein a size of the third data segment is determined based on a position of the viewer focal point relative to a position, at the first time, of the first data segment on a surface of a spherical-hull centered about the viewer.

61. The system of embodiment 35 wherein a size of the third segment determined based on a change in a viewer focal point with respect to a location on a surface of a spherical-hull centered about the viewer.

62. A system for generating metadata associated with playback of virtual reality ("VR") content, the system comprising:
a viewing device comprising:
a graphical processing unit ("GPU") and a central processing unit ("CPU") for presenting the VR content to the viewer;
a screen for displaying the presented VR content; a magnetometer, accelerometer and/or gyroscope for detecting a position of a viewer focal point with respect to the presented VR content; and
a transceiver configured to transmit and receive data;
wherein the viewing device is configured to:
register metadata comprising:
the viewer focal point;
a narrative node of the VR content being presented to the viewer on the screen; and
a time stamp associated with the playback of the VR content;
transmit the registered metadata record to a remote database.

63. The system of embodiment 62, wherein the transceiver wirelessly transmits and receives data.

64. The system of embodiment 62 wherein the position of the viewer focal point is measured with respect to a two-dimensional projection of the VR content displayed on the screen 65. The system of embodiment 62 wherein the viewer focal point is measured with respect to spherical position of the presented VR content on a spherical-hull centered about the viewer.

66. The system of embodiment 62 wherein the viewer focal point is measured with respect to a position of the presented VR content on a surface of a cube centered about the viewer.

67. The system of embodiment 62 wherein the viewer focal point is measured with respect to a position of the presented VR content on a surface of a cylinder centered about the viewer.

68. The system of embodiment 62 wherein the viewing device is further configured to generate a metadata record comprising the registered metadata.
69. The system of embodiment 62 wherein the viewing device is further configured to register the position of the viewer focal point with respect to:
   an object depicted within the presented VR content;
   a person depicted within the presented VR content; or
   an environmental condition depicted in the presented VR content.
70. The system of embodiment 62 wherein the viewing device is further configured to register metadata corresponding to an amount of time the focal point remains within a predetermined range of the position.
71. The system of embodiment 70 wherein the predetermined range is defined by spherical coordinates.
72. The system of embodiment 62 wherein the viewing device is further configured to register metadata corresponding to an amount of time between a shift in the focal point from a first position to a second position.
73. The system of embodiment 62 wherein the viewing device is further configured to adaptively adjust a sampling rate at which the metadata is captured based on a frequency of a shifting of the position of the focal point.
74. The system of embodiment 62 wherein when the narrative node is one of a plurality of nodes, the viewing device is further configured to capture a narrative path linking the plurality of nodes.
75. The system of embodiment 74 wherein the narrative path is determined based on the VR content corresponding to the position of the focal point at different times.
76. The system of embodiment 62 wherein the viewing device is further configured to register metadata comprising demographic data associated with:
   the location of the view device;
   the viewing device;
   the VR content; and/or
   the viewer.
77. The system of embodiment 62 further comprising a computer system configured to auto-index the metadata based on the registered metadata.
78. A method for merging metadata with virtual reality ("VR") content, the method comprising:
   identifying a metadata record associated with the VR content;
   identifying a timestamp stored in the metadata record;
   identifying a data segment of the VR content corresponding to the timestamp; and
   visually marking of the data segment of the VR content during playback of the VR content.
79. The method of embodiment 78 wherein the visual marking is applied to the VR content during playback.
80. The method of embodiment 78 wherein the VR content is visual marked prior to playback.
81. The method of embodiment 78 further comprising:
   receiving a selection of subset of metadata stored in the metadata record; and
   visually marking the VR content based on the subset of metadata.
82. The method of embodiment 78 wherein the metadata record comprises demographic data associated with a viewer of the VR content.
83. The method of embodiment 78 wherein the visual marking is applied to a 2D projection of the VR content.
84. The method of embodiment 78 wherein the metadata record is one of a plurality of metadata records associated with the VR content, the method further comprising adjusting the visual marking based on metadata included in each of the plurality of metadata records.
85. The method of embodiment 84 further comprising receiving the plurality of metadata records from a plurality of viewing devices.
86. The method of embodiment 78 further comprising correlating the position of the viewer focal point to:
   an object depicted within the presented VR content;
   a person depicted within the presented VR content;
   a data segment of the VR content;
   a narrative node of the VR content;
   a narrative path of the VR content; and/or
   an environmental condition depicted in the presented VR content.
87. The method of embodiment 78 wherein an intensity of the visual marking indicates a number of viewers focused on the data segment.
88. A system for generating a metadata record associated with VR content, the system comprising:
   a graphical processing unit ("GPU") for delivering the VR content to a viewer;
   a central processing unit ("CPU"); and
   a transmitter;
   wherein:
   the CPU is configured to:
      while the GPU is delivering the VR content, detect a viewer focal point with respect to the VR content; and
      capture the viewer focal point and a data segment of the VR content corresponding to the focal point;
      generate the metadata record comprising the viewer focal point and the data segment; and
   the transmitter is configured to transmit the metadata record to a remote database.
89. The system of embodiment 88 wherein the CPU is further configured to register:
   an object being depicted within the captured data segment;
   a person being depicted within the data segment; or
   an environmental condition depicted in the data segment.
90. The system of embodiment 88 wherein the CPU is further configured to register an amount of time the focal point corresponds to the data segment.
91. The system of embodiment 88 the CPU being further configured adaptively adjust a sampling rate at which the metadata is registered based on a frequency of a shifting of the focal point among a plurality of data segments.
92. The system of embodiment 88 wherein when the VR content comprises a first video frame hat is one of a plurality of video frames, the CPU is further configured to capture a narrative path through the plurality of video frames.
93. The system of embodiment 92 wherein the narrative path is determined based on a plurality of data segments corresponding to the focal point at different times.

Thus, methods and apparatus for adaptive streaming of virtual reality data have been provided. Persons skilled in the art will appreciate that the present invention can be practiced by other than the described embodiments, which are presented for purposes of illustration rather than of limitation. The present invention is limited only by the claims that follow.

What is claimed is:
1. A system for reducing computational overhead associated with streaming playback of virtual reality ("VR") content to a viewer, the system comprising:

49 a viewing device comprising:
  a graphical processing unit ("GPU")
  a central processing unit ("CPU");
  a transitory memory;
  a non-transitory memory;
  a transceiver configured to transmit and receive information over a network; and
  a software application stored in the non-transitory memory and executable by the CPU and/or GPU;
wherein the software application controls the streaming playback of the VR content by:
  calculating an expected position of a viewer focal area with respect to an asset of the VR content;
  requesting, based on the expected position of the viewer focal area, a first set of data segments that comprises less than all of the asset;
  receiving the first set of data segments over the network;
  instructing the CPU and/or GPU to decode the first set of data segments;
  storing the decoded set of data segments in the transitory memory before the asset is scheduled to be played back to the viewer;
  when the asset is scheduled to be played back to the viewer, in response to detecting that the viewer focal area includes the expected position, playing back, on the viewing device, the decoded set of data segments stored in the transitory memory;
  requesting, based on the expected position of the viewer focal area, a second set of data segments that comprises less than all of the asset and corresponds to an area outside the expected viewer focal area; and
  not decoding the second set of data segments before the asset is scheduled for playback on the viewing device.

2. The system of claim 1, wherein the playing back of the decoded set of data segments comprises:
  drawing a first set of pixels on a screen of the viewing device corresponding to a right eye view; and
  drawing a second set of pixels on the screen corresponding to a left eye view.

3. The system of claim 1 wherein the software application further controls the streaming playback of the VR content by:
  requesting the first set of data segments from a first plurality of renditions associated with the asset, each member of the first plurality having a resolution above a threshold resolution; and
  requesting the second set of data segments from a second plurality of renditions associated with the asset, each member of the second plurality having a resolution below the threshold resolution.

4. The system of claim 1 wherein the first set of data segments is one of a plurality of sets, and the software application controls the streaming playback of the VR content such that, before activating the asset, the plurality of sets is stored in the transitory memory;
wherein the plurality of sets comprises all of the asset.

5. The system of claim 1 wherein the asset is an audio asset.

6. The system of claim 1 wherein software application is further configured to:
  receive each member of the first set of data segments at a different time; and
  synchronize playback of each member of the first set of data segments.

7. The system of claim 1, wherein a computational overhead imposed on the CPU and/or GPU to render a first number of pixels based on the decoded set of data segments

50 is less than a computational overhead that would have been imposed on the CPU and/or GPU to render a second number of pixels by decoding all of the asset.

8. The system of claim 1 wherein the asset comprises a vector object.

9. The system of claim 8 wherein the vector object comprises a representation of a three-dimensional object.

10. The system of claim 8 wherein the vector object comprises a representation of a two-dimensional object.

11. The system of claim 1 wherein the asset comprises an image.

12. The system of claim 1 wherein the asset comprises an object that is responsive to viewer interaction.

13. The system of claim 1 wherein the software application further controls the streaming playback of the VR content by:
  requesting the first set of data segments from a first rendition associated with the asset; and
  requesting the second set of data segments from a second rendition associated with the asset.

14. The system of claim 13, wherein:
  the first rendition is configured for display to a right eye of the viewer; and
  the second rendition is configured for display to a left eye of the viewer.

15. The system of claim 13, wherein:
  the first rendition is associated with a first data-quality level; and
  the second rendition is associated with a second data-quality level.

16. The system of claim 1 wherein the software application further controls the streaming playback of the VR content by:
  receiving the first set of data segments over a network at a first time;
  receiving the second set of data segments over the network at a second time; and
  synchronizing playback the first and second data segments based on a narrative playback timeline associated with the VR content.

17. A system for reducing computational overhead associated with streaming playback of virtual reality ("VR") content to a viewer, the system comprising:
  a viewing device comprising:
    a graphical processing unit ("GPU")
    a central processing unit ("CPU");
    a transitory memory;
    a non-transitory memory;
    a transceiver configured to transmit and receive information over a network; and
    a software application stored in the non-transitory memory and executable by the CPU and/or GPU;
  wherein the software application controls the streaming playback of the VR content by:
    calculating an expected position of a viewer focal area with respect to an asset of the VR content;
    requesting, based on the expected position of the viewer focal area, a first set of data segments that comprises less than all of the asset;
    receiving the first set of data segments over the network;
    instructing the CPU and/or GPU to decode the first set of data segments;
    storing the decoded set of data segments in the transitory memory before the asset is scheduled to be played back to the viewer;
    when the asset is scheduled to be played back to the viewer, in response to detecting that the viewer focal area includes the expected position, playing back, on the viewing device, the decoded set of data segments stored in the transitory memory;

traversing, within a manifest file associated with the VR content, all possible paths to the asset and determine an earliest possible time at which playback of the asset occurs; and before the earliest possible time, requesting the set of data segments.

18. The system of claim 17, wherein software application is further configured to:

traverse the manifest file and detect a cluster of a threshold number of assets within the VR content that are each associated with playback at substantially the same time; and in response to detecting the cluster, sequentially requesting a set of data segments for each asset in the cluster.

19. The system of claim 17 wherein:

the set of data segments is a first set of data segments, and the software application further controls the streaming playback of the VR content by requesting, based on the expected position of the viewer focal area, a second set of data segments that comprises less than all of the asset and corresponds to an area outside the expected viewer focal area; and the software application further controls the streaming playback of the VR content by:

requesting the first set of data segments from a first rendition associated with the asset; and requesting the second set of data segments from a second rendition associated with the asset.

20. The system of claim 19 wherein the software application further controls the streaming playback of the VR content by:

receiving the first set of data segments over a network at a first time;

receiving the second set of data segments over the network at a second time; and synchronizing playback the first and second data segments based on a narrative playback timeline associated with the VR content.

21. The system of claim 19, wherein:

the first rendition is configured for display to a right eye of the viewer; and the second rendition is configured for display to a left eye of the viewer.

22. The system of claim 19, wherein:

the first rendition is associated with a first data-quality level; and the second rendition is associated with a second data-quality level.

23. The system of claim 17 wherein the asset comprises a vector object.

24. The system of claim 23 wherein the vector object comprises a representation of a three-dimensional object.

25. The system of claim 23 wherein the vector object comprises a representation of a two-dimensional object.

26. The system of claim 17 wherein the asset comprises an image.

27. The system of claim 17 wherein the asset comprises an object that is responsive to viewer interaction.

* * * * *